United States Patent
Williamson

(10) Patent No.: US 11,131,605 B2
(45) Date of Patent: Sep. 28, 2021

(54) SYSTEM AND METHOD FOR COLLECTING EXHAUST SAMPLES FOR AN EMISSIONS TEST SYSTEM

(71) Applicant: AVL TEST SYSTEMS, INC., Plymouth, MI (US)

(72) Inventor: James Patrick Williamson, Dexter, MI (US)

(73) Assignee: AVL Test Systems, Inc., Plymouth, MI (US)

( * ) Notice: Subject to any disclaimer, the term of this patent is extended or adjusted under 35 U.S.C. 154(b) by 118 days.

(21) Appl. No.: 16/443,010

(22) Filed: Jun. 17, 2019

(65) Prior Publication Data

US 2019/0391044 A1    Dec. 26, 2019

Related U.S. Application Data

(60) Provisional application No. 62/688,671, filed on Jun. 22, 2018.

(51) Int. Cl.
*G01M 15/10* (2006.01)
*F01N 11/00* (2006.01)

(52) U.S. Cl.
CPC .......... *G01M 15/102* (2013.01); *F01N 11/00* (2013.01)

(58) Field of Classification Search
CPC .............................. G01M 15/102; F01N 11/00
See application file for complete search history.

(56) References Cited

U.S. PATENT DOCUMENTS

| | | | | |
|---|---|---|---|---|
| 4,307,773 | A | * 12/1981 | Smith | F28D 19/02 165/104.16 |
| 5,241,987 | A | * 9/1993 | Ohmi | B01F 3/026 137/597 |
| 2007/0082601 | A1 | * 4/2007 | Desrochers | F24F 3/0442 454/256 |
| 2015/0153254 | A1 | 6/2015 | Silvis et al. | |
| 2018/0113058 | A1 | 4/2018 | Schroder et al. | |

OTHER PUBLICATIONS

English Translation of Search Report Corresponding to German Application No. 10 2019 116 830.9 dated May 14, 2020, 5 pages.

* cited by examiner

*Primary Examiner* — Eric S. McCall
(74) *Attorney, Agent, or Firm* — Honigman LLP; Matthew H. Szalach

(57) ABSTRACT

An emissions test system includes a dilution tunnel, a clean circuit, a dirty circuit, and a sampling control module. The dilution tunnel is configured to receive exhaust gas from an engine and dilution gas from a dilution gas source. The clean circuit is configured to receive gas from the dilution tunnel. The dirty circuit is configured to receive gas from the dilution tunnel independent of the clean circuit. The sampling control module is configured to direct gas from the dilution tunnel to the dirty circuit when the engine is off at the start of a first test phase. The sampling control module is configured to direct gas from the dilution tunnel to the clean circuit at the end of the first test phase when the engine is switched on during the first test phase.

15 Claims, 5 Drawing Sheets

SYSTEM AND METHOD FOR COLLECTING EXHAUST SAMPLES FOR AN EMISSIONS TEST SYSTEM

CROSS-REFERENCE TO RELATED APPLICATIONS

This application claims the benefit of U.S. Provisional Application No. 62/688,671, filed on Jun. 22, 2018. The entire disclosure of the application referenced above is incorporated herein by reference.

FIELD

The present disclosure relates to emissions test systems, and more particularly, to systems and methods for collecting clean and dirty exhaust samples.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Emissions test systems collect exhaust gas produced by an engine and measure the concentrations of emissions in the exhaust gas. The concentration of an emission measured during a period is multiplied by the mass flow rate of exhaust gas during that period to obtain the mass flow rate of the emission. The mass flow rate of the emission is then multiplied by the duration of the period to obtain the total mass of the emission in the exhaust gas produced by the engine during the period.

A constant volume sampling (CVS) system is a type of emissions test system that enables determining the mass of emissions in exhaust gas without measuring the flow rate of the exhaust gas, which simplifies emission mass determinations. A CVS system typically includes a dilution tunnel in which exhaust gas and a dilution gas are mixed, a sample probe that directs a sample of the diluted exhaust gas from the dilution tunnel to a sample collector, and a blower disposed downstream of the dilution tunnel. The blower draws a constant volume of diluted exhaust gas through the dilution tunnel. Thus, the exhaust gas flow rate may be determined by subtracting the flow rate of the dilution gas from the flow rate of the diluted exhaust gas.

SUMMARY

A first example of an emissions test system according to the present disclosure includes a dilution tunnel, a clean circuit, a dirty circuit, and a sampling control module. The dilution tunnel is configured to receive exhaust gas from an engine and dilution gas from a dilution gas source. The clean circuit is configured to receive gas from the dilution tunnel. The dirty circuit is configured to receive gas from the dilution tunnel independent of the clean circuit. The sampling control module is configured to direct gas from the dilution tunnel to the dirty circuit when the engine is off at the start of a first test phase. The sampling control module is configured to direct gas from the dilution tunnel to the clean circuit at the end of the first test phase when the engine is switched on during the first test phase.

In one example, the dirty circuit includes a first dirty collector and a second dirty collector, the sampling control module is configured to direct gas from the dilution tunnel to the first dirty collector when the engine is off at the start of the first test phase, and the sampling control module is configured to direct gas from the dilution tunnel to the second dirty collector at the start of a second test phase after the first test phase when the engine is not switched on during the first test phase.

In one example, during the second test phase, the sampling control module is configured to vent gas from the first dirty collector to an exhaust line, supply purge gas from a purge gas source to the first dirty collector, and vent the purge gas from the first dirty collector to the exhaust line.

In one example, the sampling control module is configured to direct gas from the dilution tunnel to the clean circuit at the end of the second test phase when the engine is switched on during the second test phase, and the sampling control module is configured to direct gas from the dilution tunnel to the first dirty collector at the start of a third test phase after the second test phase when the engine is not switched on during the second test phase.

In one example, the clean circuit includes a clean collector and a clean supply line configured to supply gas from the dilution tunnel to the clean collector, and the dirty circuit further includes a first dirty supply line and a second dirty supply line. The first dirty supply line is configured to supply gas from the dilution tunnel to the first dirty collector. The second dirty supply line is configured to supply gas from the dilution tunnel to the second dirty collector. The first and second dirty supply lines are connected to the dilution tunnel independent of the clean supply line.

In one example, the clean circuit further includes a clean fill valve disposed in the clean supply line, and the dirty circuit includes a first dirty fill valve disposed in the first dirty supply line and a second dirty fill valve disposed in the second dirty supply line.

In one example, the sampling control module is configured to open the first dirty fill valve, close the clean fill valve, and close the second dirty fill valve when directing gas from the dilution tunnel to the first dirty collector, the sampling control module is configured to open the second dirty fill valve, close the clean fill valve, and close the first dirty fill valve when directing gas from the dilution tunnel to the second dirty collector, and the sampling control module is configured to open the clean fill valve, close the first dirty fill valve, and close the second dirty fill valve when directing gas from the dilution tunnel to the clean collector.

In one example, the clean circuit further includes a clean pump disposed in the clean supply line, and the dirty circuit further includes a dirty pump disposed in at least one of the first dirty and second dirty supply lines.

In one example, the sampling control module is configured to activate the dirty pump and deactivate the clean pump when directing gas from the dilution tunnel to at least one of the first and second dirty collectors, and the sampling control module is configured to activate the clean pump and deactivate the dirty pump when directing gas from the dilution tunnel to the clean collector.

In one example, the clean circuit further includes a clean vent valve, a purge valve, and a read valve, and the dirty circuit further includes a first vent valve, a second vent valve, a first purge valve, and a second purge valve. The clean vent valve is configured to control the flow of gas from the clean collector to an exhaust line. The purge valve is configured to control the flow of purge gas from a purge gas source to the respective collector. The read valve is configured to control the flow of gas from the clean collector to an analyzer. The first vent valve is configured to control the flow of gas from the first dirty collector to the exhaust line. The second vent valve is configured to control the flow of gas from the second dirty collector to the exhaust line. The first purge valve is configured to control the flow of purge gas from the purge gas source to the first dirty collector. The second purge valve is configured to control the flow of purge gas from the purge gas source to the second dirty collector.

A second example of an emissions test system according to the present disclosure includes a dilution tunnel, a clean circuit, a dirty circuit, and a sampling control module. The dilution tunnel is configured to receive exhaust gas from an engine and dilution gas from a dilution gas source. The clean circuit is configured receive gas from the dilution tunnel. The dirty circuit is configured to receive gas from the dilution tunnel independent of the clean circuit. The sampling control module is configured to direct gas from the dilution tunnel to one of the clean and dirty circuits. The sampling control module is configured to stop directing gas to one of the clean and dirty circuits and start directing gas to the other one of the clean and dirty circuits based on an operating condition of the engine.

In one example, the engine operating condition includes at least one of a load on the engine and a temperature of exhaust produced by the engine.

In one example, the sampling control module is configured to direct gas from the dilution tunnel to the clean circuit when the engine load is less than a first load, and the sampling control module is configured to stop directing gas from the dilution tunnel to the clean circuit and start directing gas from the dilution tunnel to the dirty circuit when the engine load is greater than the first load.

In one example, the sampling control module is configured to direct gas from the dilution tunnel to the clean circuit when the exhaust temperature is less than a first temperature, and the sampling control module is configured to stop directing gas from the dilution tunnel to the clean circuit and start directing gas from the dilution tunnel to the dirty circuit when the exhaust temperature is greater than the first temperature.

In one example, the clean circuit includes a clean collector and a clean supply line, and the dirty circuit includes a dirty collector and a dirty supply line. The clean supply line is configured to supply gas from the dilution tunnel to the clean collector. The dirty supply line is configured to supply gas from the dilution tunnel to the dirty collector. The dirty supply line is connected to the dilution tunnel independent of the clean supply line.

In one example, the sampling control module is configured to direct gas from the dilution tunnel to the dirty circuit during a first test phase when the engine is off at the start of the first test phase, and the sampling control module is configured to direct gas from the dilution tunnel to the clean circuit during a second test phase after the first test phase when the engine is switched on during the first test phase.

A third example of an emissions test system according to the present disclosure includes a dilution tunnel, a first collector, a second collector, and a sampling control module. The dilution tunnel is configured to receive exhaust gas from an engine and dilution gas from a dilution gas source. The first collector is configured to collect gas from the dilution tunnel. The second collector is configured to collect gas from the dilution tunnel. The sampling control module is configured to direct gas from the dilution tunnel to the first collector and prevent the flow of gas from the dilution tunnel to the second collector during a first test phase of a test schedule. The sampling control module is configured to direct gas from the dilution tunnel to the second collector and prevent the flow of gas from the dilution tunnel to the first collector during a second test phase of the test schedule. The sampling control module is configured to direct gas from the dilution tunnel to the first collector and prevent the flow of gas from the dilution tunnel to the second collector during a third test phase of the test schedule.

In one example, during the second test phase, the sampling control module is configured to vent gas from the first collector to an exhaust line, supply purge gas from a purge gas source to the first collector, and vent the purge gas from the first collector to the exhaust line.

In one example, the emissions test system further includes a first supply line, a first fill valve disposed in the first supply line, a second supply line, and a second fill valve disposed in the second supply line. The first supply line is configured to supply gas from the dilution tunnel to the first collector. The second supply line is configured to supply gas from the dilution tunnel to the second collector.

In one example, the emissions test system further includes a first vent valve, a first purge valve, a first read valve, a second vent valve, a second purge valve, and a second read valve. The first vent valve is configured to control the flow of gas from the first collector to an exhaust line. The first purge valve is configured to control the flow of purge gas from a purge gas source to the first collector. The first read valve is configured to control the flow of gas from the first collector to an analyzer. The second vent valve is configured to control the flow of gas from the second collector to the exhaust line. The second purge valve is configured to control the flow of purge gas from the purge gas source to the second collector. The second read valve is configured to control the flow of gas from the second collector to the analyzer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
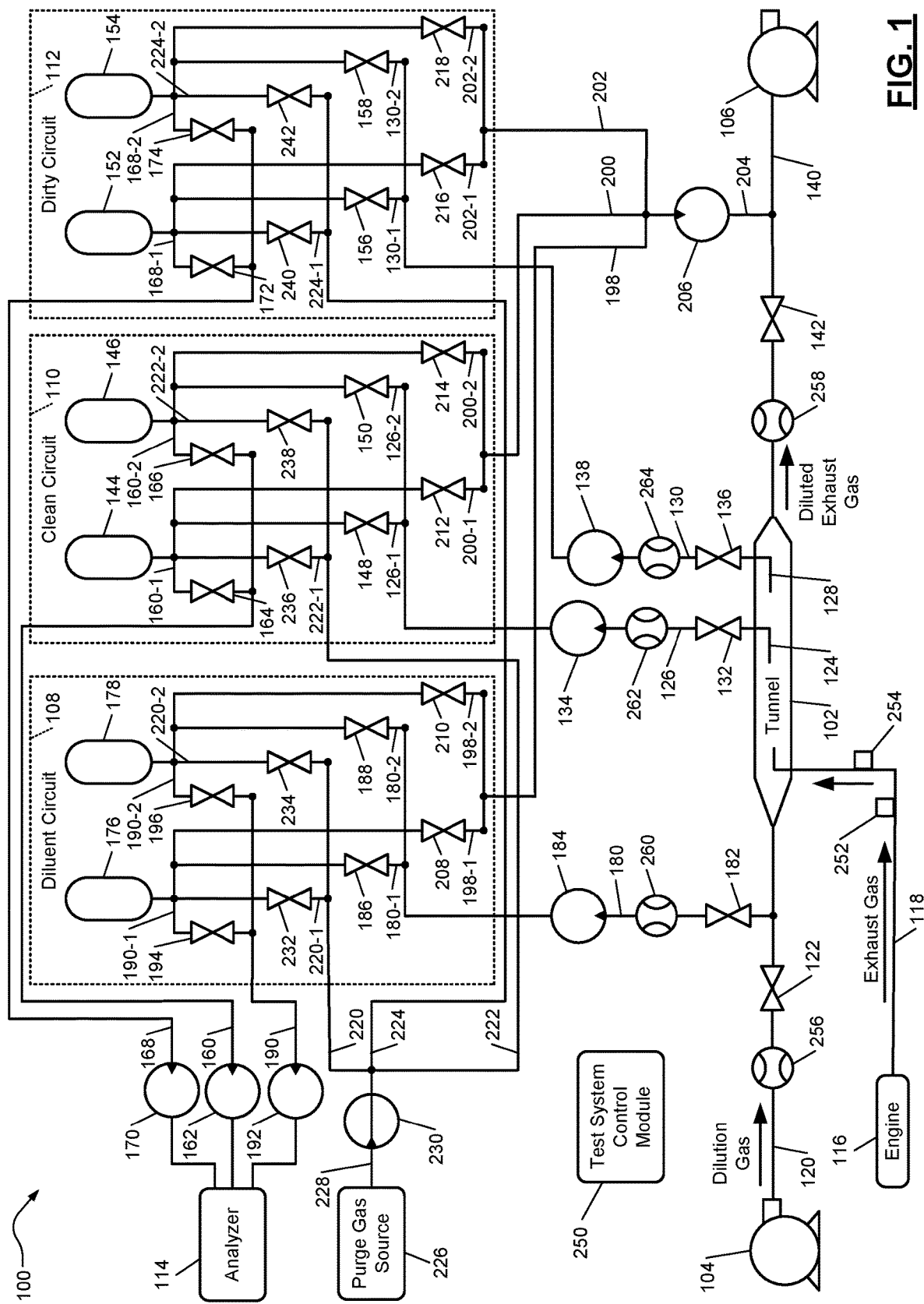
FIG. 1 is a functional block diagram of an example emissions test system according to the present disclosure.

Emissions test systems such as CVS systems mix exhaust gas produced by an engine with a dilution gas, collect a sample of the diluted exhaust gas, and measure the concentrations of emissions in the diluted exhaust gas sample. When an engine is started, the amount of emissions produced by the engine is greater than normal and may contaminate the equipment used to collect the diluted exhaust gas sample (e.g., line, valve, pump, sample collector). If the equipment becomes contaminated, the analysis of diluted exhaust samples collected using the equipment may not be accurate.

To address this issue, some emissions test systems collect diluted exhaust samples using a dedicated "dirty" circuit until and when the engine is started, and then collect diluted exhaust samples using a dedicated "clean" circuit after the engine is started. Each of the clean and dirty circuits may include a sample collector, a line extending from a dilution tunnel to the sample collector, and a valve and/or pump disposed in the line to control the flow of diluted exhaust gas from the dilution tunnel to the sample collector. Thus, the clean and dirty circuits may collect diluted exhaust gas samples from a dilution tunnel completely independent from one another. As a result, the clean circuit is not contaminated by the emissions produced by the engine when the engine starts, and therefore the clean circuit may be used to collect diluted exhaust gas samples when measuring low levels of emissions.

When evaluating the amount of emissions produced by a non-hybrid vehicle, the engine starts at a known time during a test schedule. For example, the test schedule may include multiple test phases, and the test schedule may specify that the engine is to be started during the first test phase. In this example, an emissions test system having clean and dirty circuits would typically collect diluted exhaust gas using the dirty circuit during the first test phase, and then collect diluted exhaust gas using the clean circuit for every test phase after the first test phase. A test phase is that portion of the test schedule during which exhaust gas is collected in the sample collector.

In contrast, when evaluating the amount of emissions produced by a hybrid vehicle, the time during the test schedule when the engine will start is unknown. This is because the test schedule specifies a vehicle speed with respect to time, and the engine may not be required to achieve the specified vehicle speed unless the specified vehicle speed is high and/or the state of charge of a battery in the vehicle is low. Thus, the strategy of separating exhaust samples into clean and dirty circuits is not typically employed for hybrid vehicles, and therefore emissions test systems used to collect exhaust gas samples from hybrid vehicles are likely to become contaminated.

To address this issue, a system and method according to the present disclosure determines when an engine is started during a test schedule, and uses this information to determine whether to direct exhaust gas samples to a clean circuit or a dirty circuit. In one example, the system and method collects exhaust gas samples using the dirty circuit during each test phase before the engine is started and during the test phase in which the engine is started. The system and method then collects exhaust gas samples using the clean circuit for each test phase after the test phase in which the engine is started. The system and method may determine when the engine is started based on the pressure of exhaust gas produced by the engine as discussed below.

In addition, instead of using a different sample collector to collect an exhaust sample during each test phase, the system and method purges each sample collector after it is used to collect an exhaust gas sample, and then reuses the sample collector. As a result, the number of sample collectors needed to execute a test schedule may be reduced. This may be especially beneficial in connection with hybrid vehicles since it is unknown when the engine will start during a test schedule. To this end, if a test schedule has five phases and the sample collectors are not purged and reused during the test schedule, it may be necessary for each of the clean and dirty circuits to have five sample collectors. In contrast, by purging a used sample collector while another sample collector is used to collect an exhaust gas sample, the system and method according to the present disclosure can have as few as two sample collectors in each of the clean and dirty circuits regardless of the number of test phases in a test schedule.

Referring now to FIG. 1, an emissions test system 100 includes a dilution tunnel 102, an upstream blower 104, a downstream blower 106, a diluent circuit 108, a clean circuit 110, a dirty circuit 112, and an emissions analyzer 114. The dilution tunnel 102 receives exhaust gas produced by an engine 116 through an exhaust gas supply line 118. The exhaust gas supply line 118 supplies the exhaust gas from the engine 116 to the dilution tunnel 102.

The dilution tunnel 102 also receives a dilution gas through a dilution gas supply line 120. The upstream blower 104 is disposed upstream of the dilution tunnel 102, and the upstream blower 104 sends the dilution gas through the dilution gas supply line 120 and to the dilution tunnel 102. The dilution gas may be ambient air, in which case the upstream blower 104 may draw the dilution gas from the surrounding environment. The upstream blower 104 may be a variable speed blower, and the speed of the upstream blower 104 may be adjusted to adjust the rate at which the dilution gas flows through the dilution tunnel 102. Additionally or alternatively, a valve 122 may be disposed in the dilution gas supply line 120, and the position of the valve 122 may be adjusted to adjust the flow rate of the dilution gas through the dilution tunnel 102.

The exhaust gas from the engine 116 is diluted with the dilution gas in the dilution tunnel 102. A clean sample probe 124 extracts a sample of the diluted exhaust gas, and a clean circuit supply line 126 supplies the diluted exhaust gas sample from the clean sample probe 124 to the clean circuit 110. Similarly, a dirty sample probe 128 extracts a sample of the diluted exhaust gas, and a dirty circuit supply line 130 supplies the diluted exhaust gas sample from the dirty sample probe 128 to the dirty circuit 112.

A clean extraction valve 132 may be disposed in the clean circuit supply line 126, and the position of the clean extraction valve 132 may be adjusted to adjust the rate at which the diluted exhaust gas sample is extracted through the clean sample probe 124. Additionally or alternatively, a clean extraction pump 134 may be disposed in the clean circuit supply line 126, and the speed of the clean extraction pump 134 may be adjusted to adjust the rate at which the diluted exhaust gas sample is extracted through the clean sample probe 124. In one example, the clean extraction pump 134 is operated at a constant speed, and the position of the clean extraction valve 132 is adjusted to adjust the extraction rate of the diluted exhaust gas through the clean sample probe 124. The clean sample probe 124, the clean circuit supply line 126, the clean extraction valve 132, and the clean extraction pump 134 may be considered part of the clean circuit 110.

A dirty extraction valve 136 may be disposed in the dirty circuit supply line 130, and the position of the dirty extraction valve 136 may be adjusted to adjust the rate at which the diluted exhaust gas sample is extracted through the dirty sample probe 128. Additionally or alternatively, a dirty extraction pump 138 may be disposed in the dirty circuit supply line 130, and the speed of the dirty extraction pump 138 may be adjusted to adjust the rate at which the diluted exhaust gas sample is extracted through the dirty sample probe 128. In one example, the dirty extraction pump 138 is operated at a constant speed, and the position of the dirty extraction valve 136 is adjusted to adjust the extraction rate of the diluted exhaust gas through the dirty sample probe 128. The dirty sample probe 128, the dirty circuit supply line 130, the dirty extraction valve 136, and the dirty extraction pump 138 may be considered part of the dirty circuit 112.

The portion of the diluted exhaust gas that is not extracted by either one of the clean and dirty sample probes 124 and 128 is expelled from the dilution tunnel 102 to the atmosphere through a dilution tunnel exhaust line 140. A valve 142 may be disposed in the dilution tunnel exhaust line 140, and the position of the valve 142 may be adjusted to adjust the rate at which the diluted exhaust gas flows through the dilution tunnel 102. Additionally or alternatively, the downstream blower 106 may be disposed downstream of the dilution tunnel 102, and the speed of the downstream blower 106 may be adjusted to adjust the rate at which the diluted exhaust gas flows through the dilution tunnel 102.

In various implementations, the emissions test system 100 may include only one of the upstream and downstream blowers 104 and 106. The upstream blower 104 and/or the downstream blower 106 may be controlled to force a constant volume of diluted exhaust gas through the dilution tunnel 102. In this regard, the emissions test system 100 may be a CVS system. However, the methods of the present disclosure for switching between filling clean and dirty circuits and/or switching between and reusing collectors of those circuits during a single test schedule also apply to partial flow systems such as a bag mini dilutor.

The clean circuit 110 includes first and second clean sample collectors 144 and 146 that collect the diluted exhaust gas sample extracted by the clean sample probe 124. The first and second clean sample collectors 144 and 146 may be sample bags or sample filters. The clean circuit supply line 126 splits into a first clean supply line 126-1 and a second clean supply line 126-2 that supply the diluted exhaust gas sample to the first and second clean sample collectors 144 and 146, respectively. A first clean fill valve 148 may be disposed in the first clean supply line 126-1, and the first clean fill valve 148 may be opened or closed to allow or prevent the flow of the diluted exhaust gas sample to the second clean sample collector 146. Similarly, a second clean fill valve 150 may be disposed in the second clean supply line 126-2, and the second clean fill valve 150 may be opened or closed to allow or prevent the flow of diluted exhaust gas sample to the second clean sample collector 146.

The dirty circuit 112 includes first and second dirty sample collectors 152 and 154 that collect the diluted exhaust gas sample extracted by the dirty sample probe 128. The first and second dirty sample collectors 152 and 154 may be sample bags or sample filters. The dirty circuit supply line 130 splits into a first dirty supply line 130-1 and a second dirty supply line 130-2 that supply the diluted exhaust gas sample to the first and second dirty sample collectors 152 and 154, respectively. A first dirty fill valve 156 may be disposed in the first dirty supply line 130-1, and the first dirty fill valve 156 may be opened or closed to allow or prevent the flow of the diluted exhaust gas sample to the first dirty sample collector 152. Similarly, a second dirty fill valve 158 may be disposed in the second dirty supply line 130-2, and the second dirty fill valve 158 may be opened or closed to allow or prevent the flow of diluted exhaust gas sample to the second dirty sample collector 154.

The emissions analyzer 114 analyzes the diluted exhaust gas sample collected by the first and second clean sample collectors 144 and 146 to determine the concentration of emissions contained therein. The diluted exhaust gas sample is sent from the first and second clean sample collectors 144 and 146 to the emissions analyzer 114 through a clean read line 160. A clean read pump 162 may be disposed in the clean read line 160, and the speed of the clean read pump 162 may be adjusted to adjust the rate at which the diluted exhaust gas sample flows from the first and second clean sample collectors 144 and 146 to the emissions analyzer 114.

The clean read line 160 includes first and second clean read lines 160-1 and 161-2 extending from the first and second clean sample collectors 144 and 146, respectively. A first clean read valve 164 may be disposed in the first clean read line 160-1, and the first clean read valve 164 may be opened or closed to allow or prevent the flow of the diluted exhaust gas sample from the first clean sample collector 144 to the emissions analyzer 114. Similarly, a second clean read valve 166 may be disposed in the second clean read line 160-2, and the second clean read valve 166 may be opened or closed to allow or prevent the flow of diluted exhaust gas sample from the second clean sample collector 146 to the emissions analyzer 114.

The emissions analyzer 114 may also analyze the diluted exhaust gas sample collected by the first and second dirty sample collectors 152 and 154 to determine the concentration of emissions contained therein. The diluted exhaust gas sample is sent from the first and second dirty sample collectors 152 and 154 to the emissions analyzer 114 through a dirty read line 168. A dirty read pump 170 may be disposed in the dirty read line 168, and the speed of the dirty read pump 170 may be adjusted to adjust the rate at which the diluted exhaust gas sample flows from the first and second dirty sample collectors 152 and 154 to the emissions analyzer 114.

The dirty read line 168 includes first and second dirty read lines 168-1 and 168-2 extending from the first and second clean sample collectors 144 and 146, respectively. A first dirty read valve 172 may be disposed in the first dirty read line 168-1, and the first dirty read valve 172 may be opened or closed to allow or prevent the flow of the diluted exhaust gas sample from the first dirty sample collector 152 to the emissions analyzer 114. Similarly, a second dirty read valve 174 may be disposed in the second dirty read line 168-2, and the second dirty read valve 174 may be opened or closed to allow or prevent the flow of diluted exhaust gas sample from the second dirty sample collector 154 to the emissions analyzer 114.

The diluent circuit 108 includes first and second diluent sample collectors 176 and 178 that collect a sample of the dilution gas flowing through the dilution gas supply line 120. A diluent circuit supply line 180 supplies the dilution gas sample from the dilution gas supply line 120 to the first and second diluent sample collectors 176 and 178. A diluent extraction valve 182 may be disposed in the diluent circuit supply line 180, and the position of the diluent extraction valve 182 may be adjusted to adjust the rate at which the dilution gas sample is extracted from the dilution gas supply line 120. Additionally or alternatively, a diluent extraction pump 184 may be disposed in the diluent circuit supply line 180, and the speed of the diluent extraction pump 184 may be adjusted to adjust the rate at which the dilution gas sample is extracted from the dilution gas supply line 120. In one example, the diluent extraction pump 184 is operated at a constant speed, and the position of the diluent extraction valve 182 is adjusted to adjust the extraction rate of the dilution gas sample. The diluent circuit supply line 180, the diluent extraction valve 182, and the diluent extraction pump 184 may be considered part of the diluent circuit 108.

The first and second diluent sample collectors 176 and 178 may be sample bags or sample filters. The diluent circuit supply line 180 splits into a first diluent supply line 180-1 and a second diluent supply line 180-2 that supply the dilution gas sample to the first and second diluent sample collectors 176 and 178, respectively. A first diluent fill valve 186 may be disposed in the first diluent supply line 180-1, and the first diluent fill valve 186 may be opened or closed to allow or prevent the flow of the dilution gas sample to the first diluent sample collector 176. Similarly, a second diluent fill valve 188 may be disposed in the second diluent supply line 180-2, and the second diluent fill valve 188 may be opened or closed to allow or prevent the flow of the dilution gas sample to the second diluent sample collector 178.

The emissions analyzer 114 analyzes the dilution gas sample collected by the first and second diluent sample collectors 176 and 178 to determine the concentration of emissions contained therein. The emissions analyzer 114 may account for the concentration of emissions contained in the dilution gas sample when determining the concentration of emissions contained in the diluted exhaust gas samples extracted by the clean and dirty sample probe 124 and 128. For example, if the mass of the dilution gas in the diluted exhaust gas sample is equal to the mass of the dilution gas in the dilution gas sample, the emissions analyzer 114 may subtract the concentration of emissions in the dilution gas sample from the concentration of emissions in the diluted exhaust gas sample to obtain the concentration of emissions in the exhaust gas contained in the diluted exhaust gas sample.

The diluted exhaust gas sample is sent from the first and second diluent sample collectors 176 and 178 to the emissions analyzer 114 through a diluent read line 190. A diluent read pump 192 may be disposed in the diluent read line 190, and the speed of the diluent read pump 192 may be adjusted to adjust the rate at which the dilution gas sample flows from the first and second diluent sample collectors 176 and 178 to the emissions analyzer 114.

The diluent read line 190 includes first and second diluent read lines 190-1 and 190-2 extending from the first and second diluent sample collectors 176 and 178, respectively. A first diluent read valve 194 may be disposed in the first diluent read line 190-1, and the first diluent read valve 194 may be opened or closed to allow or prevent the flow of the dilution gas sample from the first diluent sample collector 176 to the emissions analyzer 114. Similarly, a second diluent read valve 196 may be disposed in the second diluent read line 190-2, and the second diluent read valve 196 may be opened or closed to allow or prevent the flow of dilution gas sample from the second diluent sample collector 178 to the emissions analyzer 114.

The emissions test system 100 further includes a diluent vent line 198, a clean vent line 200, and a dirty vent line 202 for venting gas samples from the first and second diluent sample collectors 176 and 178, the first and second clean sample collectors 144 and 146, and the first and second dirty sample collectors 152 and 154, respectively. In the example shown, the diluent, clean, and dirty vent lines 198, 200, and 202 converge into a single vent line 204 that extends to the dilution tunnel exhaust line 140, and a vent pump 206 is disposed in the vent line 204 to draw gas samples through the vent line 204. In various implementations, the diluent, clean, and dirty vent lines 198, 200, and 202 may not converge into a single vent line and/or may vent gas samples directly to the atmosphere. In addition, a vent pump (not shown) may be disposed in each of the diluent, clean, and dirty vent lines 198, 200, and 202 in place of the vent pump 206.

The diluent vent line 198 includes first and second diluent vent lines 198-1 and 198-2 extending from the first and second diluent sample collectors 176 and 178, respectively. A first diluent vent valve 208 may be disposed in the first diluent vent line 198-1, and the first diluent vent valve 208 may be opened or closed to allow or prevent the flow of the dilution gas sample from the first diluent sample collector 176 to the dilution tunnel exhaust line 140. Similarly, a second diluent vent valve 210 may be disposed in the second diluent vent line 198-2, and the second diluent vent valve 210 may be opened or closed to allow or prevent the flow of the dilution gas sample from the second diluent sample collector 178 to the dilution tunnel exhaust line 140.

The clean vent line 200 includes first and second clean vent lines 200-1 and 200-2 extending from the first and second clean sample collectors 144 and 146, respectively. A first clean vent valve 212 may be disposed in the first clean vent line 200-1, and the first clean vent valve 212 may be opened or closed to allow or prevent the flow of the diluted exhaust gas sample from the first clean sample collector 144 to the dilution tunnel exhaust line 140. Similarly, a second clean vent valve 214 may be disposed in the second clean vent line 200-2, and the second clean vent valve 214 may be opened or closed to allow or prevent the flow of the diluted exhaust gas sample from the second clean sample collector 146 to the dilution tunnel exhaust line 140.

The dirty vent line 202 includes first and second dirty vent lines 202-1 and 202-2 extending from the first and second dirty sample collectors 152 and 154, respectively. A first dirty vent valve 216 may be disposed in the first dirty vent line 202-1, and the first dirty vent valve 216 may be opened or closed to allow or prevent the flow of the diluted exhaust gas sample from the first dirty sample collector 152 to the dilution tunnel exhaust line 140. Similarly, a second dirty vent valve 218 may be disposed in the second dirty vent line 202-2, and the second dirty vent valve 218 may be opened or closed to allow or prevent the flow of the diluted exhaust gas sample from the second dirty sample collector 154 to the dilution tunnel exhaust line 140.

The emissions test system 100 further includes a diluent purge line 220, a clean purge line 222, and a dirty purge line 224 for proving purge gas to the first and second diluent sample collectors 176 and 178, the first and second clean sample collectors 144 and 146, and the first and second dirty sample collectors 152 and 154, respectively. The purge gas may be a clean gas, such as ambient air that has not been mixed with exhaust gas. The purge gas is provided by a purge gas source 226, which may simply be the atmosphere or may be a filter that filters ambient air to yield the purge gas. In the implementation shown, a single purge line 228 extends from the purge gas source 226 and splits into the diluent, clean, and dirty purge lines 220, 222, and 224, and a purge pump 230 is disposed in the purge line 228 to send purge gas through the purge line 228. In various implementations, the diluent, clean, and dirty purge lines 220, 222, and 224 may extend from the purge gas source 226 independent from one another, and a purge pump (not shown) may be disposed in each of the diluent, clean, and dirty purge lines 220, 222, and 224 in place of the purge pump 230.

The diluent purge line 220 includes first and second diluent purge lines 220-1 and 220-2 extending to the first and second diluent sample collectors 176 and 178, respectively. A first diluent purge valve 232 may be disposed in the first diluent purge line 220-1, and the first diluent purge valve 232 may be opened or closed to allow or prevent the flow of purge gas from the purge gas source 226 to the first diluent sample collector 176. Similarly, a second diluent purge valve 234 may be disposed in the second diluent purge line 220-2, and the second diluent purge valve 234 may be opened or closed to allow or prevent the flow of purge gas from the purge gas source 226 to the second diluent sample collector 178.

The clean purge line 222 includes first and second clean purge lines 222-1 and 222-2 extending to the first and second clean sample collectors 144 and 146, respectively. A first clean purge valve 236 may be disposed in the first clean purge line 222-1, and the first clean purge valve 236 may be opened or closed to allow or prevent the flow of purge gas from the purge gas source 226 to the first clean sample collector 144. Similarly, a second clean purge valve 238 may be disposed in the second clean purge line 222-2, and the second clean purge valve 238 may be opened or closed to allow or prevent the flow of purge gas from the purge gas source 226 to the second clean sample collector 146.

The dirty purge line 224 includes first and second clean purge lines 224-1 and 224-2 extending to the first and second dirty sample collectors 152 and 154, respectively. A first dirty purge valve 240 may be disposed in the first dirty purge line 224-1, and the first dirty purge valve 240 may be opened or closed to allow or prevent the flow of purge gas from the purge gas source 226 to the first dirty sample collector 152. Similarly, a second dirty purge valve 242 may be disposed in the second clean purge line 224-2, and the second dirty purge valve 242 may be opened or closed to allow or prevent the flow of purge gas from the purge gas source 226 to the second dirty sample collector 154.

The emissions test system 100 further includes a test system control module 250 that controls various actuators of the emissions test system 100 based on signals received from various sensors of the emissions test system 100. The actuators of the emissions test system 100 include the blowers 104, 106, the valves 122, 132, 136, 142, 148, 150, 156, 158, 164, 166, 172, 174, 186, 188, 194, 196, 208, 210, 212, 214, 216, 218, 232, 234, 236, 238, 240, 242, and the pumps 134, 138, 162, 170, 184, 192, 206, 230. The sensors of the emissions test system 100 include an exhaust temperature sensor 252, an exhaust pressure sensor 254, a dilution gas flow meter 256, a diluted exhaust flow meter 258, a diluent sample flow meter 260, a clean sample flow meter 262, and a dirty sample flow meter 264. The diluent sample flow meter 260, the clean sample flow meter 262, and the dirty sample flow meter 264 may be considered part of the diluent circuit 108, the clean circuit 110, and the dirty circuit 112, respectively.

The test system control module 250 outputs various control signals to control the actuators of the emissions test system 100. The test system control module 250 outputs a blower control signal (FIG. 2) to each of the blowers 104, 106, and the blower control signal indicates a target duty cycle or target speed of the respective blower. The test system control module 250 outputs a valve control signal (FIG. 2) to each of the valves 122, 132, 136, 142, 148, 150, 156, 158, 164, 166, 172, 174, 186, 188, 194, 196, 208, 210, 212, 214, 216, 218, 232, 234, 236, 238, 240, 242, and the valve control signal indicates a target position of the respective valve. The test system control module 250 outputs a pump control signal (FIG. 2) to each of the pumps 134, 138, 162, 170, 184, 192, 206, 230, and the pump control signal indicates a target duty cycle or target speed of the respective pump.

The exhaust temperature sensor 252 measures the temperature of exhaust gas flowing through the exhaust gas supply line 118 and outputs an exhaust temperature signal (FIG. 2) indicating the exhaust temperature. The exhaust pressure sensor 254 measures the pressure of exhaust gas flowing through the exhaust gas supply line 118 and outputs an exhaust pressure signal (FIG. 2) indicating the exhaust pressure. The exhaust temperature and pressure sensors 252 and 254 output the exhaust temperature and pressure signals to the test system control module 250.

The dilution gas flow meter 256 measures the flow rate of dilution gas in the dilution supply line 120 and outputs a dilution gas flow rate signal (FIG. 2) indicating the dilution gas flow rate. The diluted exhaust flow meter 258 measures the flow rate of diluted exhaust gas in the dilution tunnel exhaust line 140 and outputs a diluted exhaust flow rate signal (FIG. 2) indicating the diluted exhaust flow rate. The diluent sample flow meter 260 measures the flow rate of the dilution gas sample flowing through the diluent circuit supply line 180 and outputs a diluent sample flow rate signal (FIG. 2) indicating the diluent sample flow rate. The clean sample flow meter 262 measures the flow rate of the diluted exhaust gas sample flowing through the clean circuit supply line 126 and outputs a clean sample flow rate signal (FIG. 2) indicating the clean sample flow rate. The dirty sample flow meter 264 measures the flow rate of the diluted exhaust gas sample flowing through the dirty circuit supply line 130 and outputs a dirty sample flow rate signal (FIG. 2) indicating the dirty sample flow rate. The dilution gas flow meter 256, the diluted exhaust flow meter 258, the diluent sample flow meter 260, the clean sample flow meter 262, and the dirty sample flow mater 264 output the dilution gas flow rate signal, the diluted exhaust flow rate signal, the diluent sample flow rate signal, the clean sample flow rate signal, and the dirty sample flow rate signal to the test system control module 250.

During an emissions test schedule, the test system control module 250 controls the upstream blower 104 to force diluted exhaust gas through the dilution tunnel 102 at a target flow rate and/or controls the downstream blower 106 to draw diluted exhaust gas through the dilution tunnel 102 at the target flow rate. In addition, the test system control module 250 controls the valves 132, 148, 150 to extract clean samples of diluted exhaust gas from the dilution tunnel 102 and to send the clean samples to the clean sample collectors 144, 146. In addition, the test system control module 250 controls the valves 136, 156, 158 to extract dirty samples of diluted exhaust gas from the dilution tunnel 102 and to send the dirty samples to the dirty sample collectors 152, 154. Further, the test system control module 250 controls the valves 182, 186, 188 to extract samples of dilution gas from the dilution gas supply line 120 and to send the diluent samples to the diluent sample collectors 176, 178. The test system control module 250 may direct dilution gas to one of the diluent sample collectors 176, 178 when the test system control module 250 directs diluted exhaust gas to any one of the clean and dirty sample collectors 144, 146, 152, and 154.

An emissions test schedule may include multiple test phases. For example, the U.S. Environmental Protection Agency (EPA) Federal Test Procedure includes a cold start phase, a cold stabilized phase, and a hot start phase. During each test phase, the test system control module 250 may direct diluted exhaust gas to one of the clean and dirty sample collectors 144, 146, 152, and 154 and direct dilution gas to one of the diluent sample collectors 176 and 178. The test system control module 250 may determine whether to direct diluted exhaust gas to one of the clean sample collectors 144, 146 or one of the dirty sample collectors 152, 154 based on whether the engine 116 has been started. When the engine 116 is started, the amount of emissions produced by the engine 116 may be greater than normal and may contaminate the equipment used to collect the diluted exhaust gas sample (e.g., pump, line, and valve). Thus, the test system control module 250 may direct diluted exhaust gas to one of the dirty sample collectors 152, 154 during each test phase until the engine 116 is started, and then direct diluted exhaust gas to one of the clean sample collectors 144, 146 during the test phase following the test phase during which the engine 116 is started. In this manner, the test system control module 250 minimizes contamination of the clean circuit 110, which improves the accuracy of the emissions analyzer 114 when analyzing emissions in diluted exhaust gas samples collected by the clean circuit 110.

In addition, after a sample is collected in one of the sample collectors 144, 146, 152, 154, 176, 178 during a test phase of a test schedule, the test system control module 250 purges that sample collector so that the sample collector may be reused to collect another sample during another test phase of the same test schedule. As used herein, the phrase "purging a sample collector" or similar phrases may refer to venting a sample from the sample collector (or sending the sample to an emissions analyzer), sending purge gas to the sample collector, and venting the purge gas from the sample collector. Since the test system control module 250 purges and reuses the sample collectors 144, 146, 152, 154, 176, 178 during a test schedule, the number of the sample collectors 144, 146, 152, 154, 176, 178 needed to perform the test schedule may be reduced.

Figure 2:
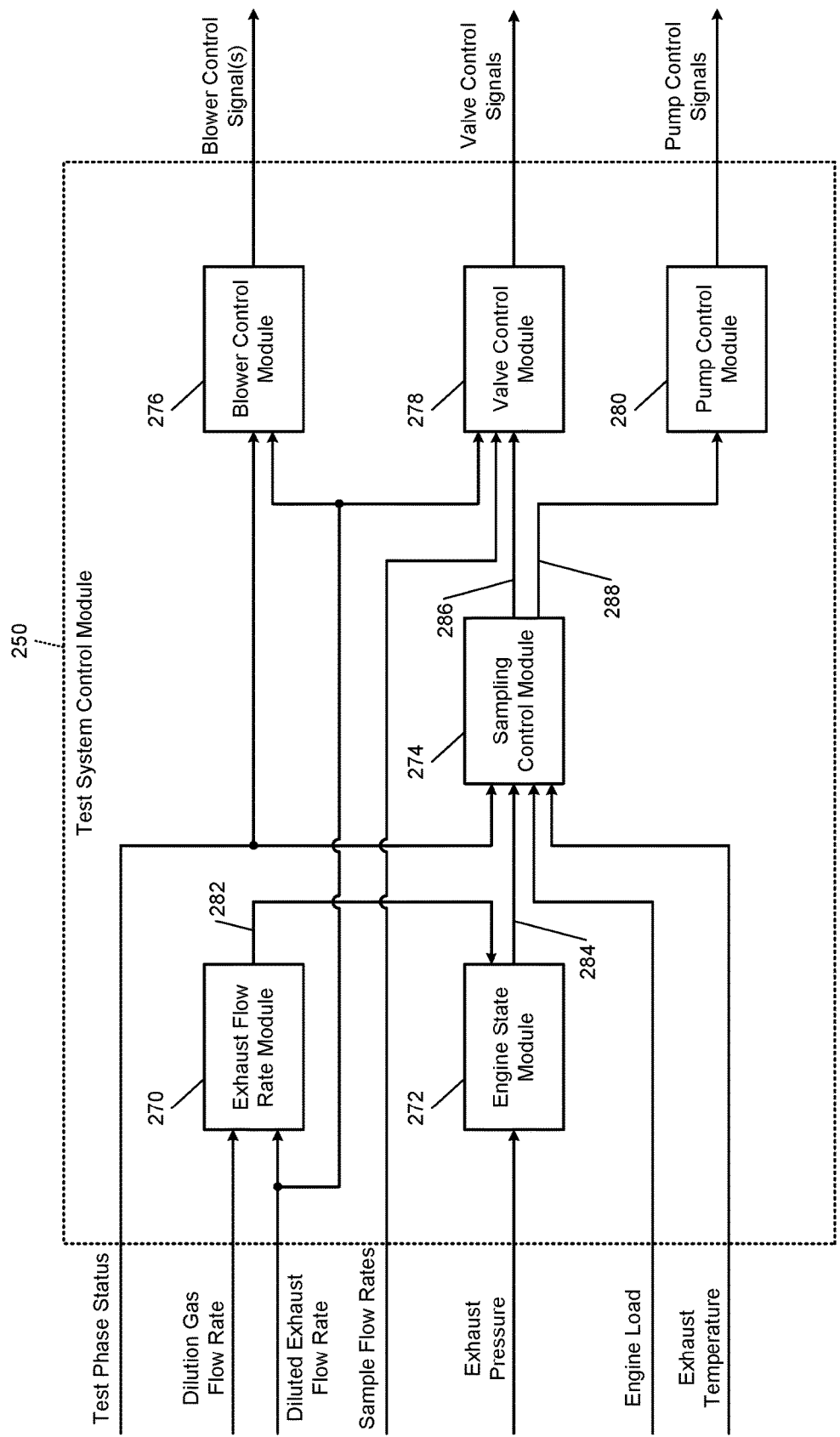
FIG. 2 is a functional block diagram of an example test system control module according to the present disclosure.

Referring now to FIG. 2, an example implementation of the test system control module 250 includes an exhaust flow rate module 270, an engine state module 272, a sampling control module 274, a blower control module 276, a valve control module 278, and a pump control module 280. The exhaust flow rate module 270 determines the flow rate of exhaust gas flowing through the exhaust gas supply line 118 and outputs a signal 282 indicating the same. In one example, the exhaust flow rate module 270 subtracts the dilution gas flow rate measured by the dilution gas flow meter 256 from the diluted exhaust flow rate measured by the diluted exhaust flow meter 258 to obtain the flow rate of exhaust gas flowing through the exhaust gas supply line 118.

In various implementations, the flow rate of exhaust gas flowing through the exhaust gas supply line 118 may be obtained from a powertrain control module (not shown) that controls the engine 116 and/or measured directly in the exhaust supply line 118. Alternatively, the exhaust flow rate module 270 may set the exhaust flow rate equal to a product of (i) the diluted exhaust flow rate measured by the diluted exhaust flow meter 258 and (ii) a ratio of a concentration of an emission (e.g., carbon dioxide) in the exhaust gas supply line 118 to a concentration of the same emission in the dilution tunnel exhaust line 140. Before determining this ratio, the exhaust flow rate module 270 may subtract the concentration of the emission in the dilution supply line 120 from the concentration of the emission in the dilution tunnel exhaust line 140. The emissions test system 100 may include one or more sensors (not shown) that measure the concentration of the emission in the dilution supply line 120 and/or the dilution tunnel exhaust line 140. Alternatively, the concentration of the emission in the dilution supply line 120 may be a predetermined (e.g., fixed) value.

The engine state module 272 determines whether the engine 116 is on or off and outputs a signal 284 indicating the same. The engine state module 272 may determine whether the engine 116 is on or off based on an input from the powertrain control module. Additionally or alternatively, the engine state module 272 may determine whether the engine 116 is on or off based on the magnitudes and/or frequency of pulsations in the exhaust pressure signal that is output by the exhaust pressure sensor 254. In one example, the engine state module 272 determines that the engine 116 is on when the magnitude of a pulsation in the exhaust pressure signal is greater than a first value. In another example, the engine state module 272 determines that the engine 116 is on when the frequency of pulsations in the exhaust pressure signal is greater than a first frequency.

The first frequency may be predetermined based on the number of cylinders in the engine 116 and the idle speed of the engine 116. For example, the first frequency may be set to a value that is less than or equal to a product of the number of cylinders in the engine 116 and the idle speed of the engine 116. The first value may also be predetermined. For example, the first value may be set to an expected change in the pressure of exhaust gas produced by the engine 116 due to a combustion event in a cylinder of the engine 116.

The engine state module 272 may determine whether the engine 116 is on or off based on both the magnitudes and frequency of pulsations in the exhaust pressure signal output. For example, the engine state module 272 may identify pulsations in the exhaust pressure signal output that have a frequency greater than or equal to the first frequency (referred to herein as higher frequency pulsations), and determine the average value of the magnitudes of the pulsations identified. The engine state module 272 may then determine that the engine 116 is on when the average value of the magnitudes of the higher frequency pulsations is greater than or equal to the first value.

The blower control module 276 controls the upstream blower 104 to force diluted exhaust gas through the dilution tunnel 102 at the target flow rate. Additionally or alternatively, the blower control module 276 controls the downstream blower 106 to draw diluted exhaust gas through the dilution tunnel 102 at the target flow rate. The blower control module 276 controls the upstream blower 104 and/or the downstream blower 106 by outputting the blower control signal(s). As discussed above, the blower control signal(s) indicate a target duty cycle or target speed of the respective blower. The blower control module 276 may adjust the target duty cycle or target speed of the upstream blower 104 and/or the downstream blower 106 to minimize a difference between the diluted exhaust flow rate measured by the diluted exhaust flow meter 258 and the target flow rate.

The blower control module 276 may control the upstream blower 104 and/or the downstream blower 106 to maintain the diluted exhaust flow rate at the target flow rate for the entire duration of a test schedule. Thus, the blower control module 276 may activate the upstream blower 104 and/or the downstream blower 106 when the first test phase of the test schedule begins, and deactivate the upstream blower 104 and/or the downstream blower 106 when the last test phase of the test schedule ends. The blower control module 276 may receive a test phase status signal indicating when each test phase of the test schedule begins and ends and the order of the test phase (e.g., first, second, third, last), and therefore indicating when the test schedule begins and ends.

The valve control module 278 may adjust the position of the valve 122 to adjust the flow rate of the dilution gas through the dilution tunnel 102. Additionally or alternatively, the valve control module 278 may adjust the position of the valve 142 to adjust the rate at which the diluted exhaust gas flows through the dilution tunnel 102. The valve control module 278 may adjust the position of the valve 142 to maintain the diluted exhaust flow rate at the target flow rate for the entire duration of a test schedule. For example, the valve control module 278 may open the valve 142 when the first test phase of the test schedule begins, and close the valve 142 when the last test phase of the test schedule ends. The valve control module 278 may also receive the test phase status signal indicating when each test phase of the test schedule begins and ends and the order of each test phase.

The test phase status signal may be generated by a test schedule execution module (not shown) that executes the test schedule in response to a user input (e.g., a user pressing a button or touching an icon on a touchscreen). The test schedule execution module may be included in the test system control module or may be a separate module that communicates with the test system control module. The test schedule execution module may store a plurality of test schedules and select a test schedule to execute from the plurality of test schedules based on the user input. Each test schedule may include a predetermined number of test phases. Each test phase may have a predetermined duration and/or specify a target vehicle speed with respect to time.

The test phase status signal may indicate the target vehicle speed with respect to time in addition to indicating when each test phase starts and ends and the order of each test phase. The test schedule module may output the test phase status signal to the powertrain control module, which may control the engine 116 and/or an electric motor (not shown) to propel a vehicle (not shown) according to the test schedule. The test schedule module may also output the test phase status signal to a dynamometer control module (not shown), which may control a dynamometer (not shown) to adjust a load applied to the engine 116 and/or to wheels of the vehicle. For example, the test phase status signal may also indicate changes in road grade with respect to time, and the dynamometer control module may adjust the load applied to the engine 116 and/or the wheels to simulate those changes in road grade.

The sampling control module 274 coordinates operation of the valve control module 278 and the pump control module 280 to direct sample gas to various ones of the sample collectors 144, 146, 152, 154, 176, 178 during each test phase of the test schedule. In addition, the sampling control module 274 coordinates operation of the valve control module 278 and the pump control module 280 to vent gas samples from some of the sample collectors 144, 146, 152, 154, 176, 178 during various test phases of the test schedule. Further, the sampling control module 274 coordinates operation of the valve control module 278 and the pump control module 280 to send purge gas to some of the sample collectors 144, 146, 152, 154, 176, 178 during various test phases of the test schedule. The sampling control module 274 may use the test phase status signal to determine when each test phase of the test schedule start and ends.

In the discussion below, the sampling control module 274 opens and closes the valves 132, 136, 148, 150, 156, 158, 164, 166, 172, 174, 186, 188, 194, 196, 208, 210, 212, 214, 216, 218, 232, 234, 236, 238, 240, 242. The sampling control module 274 may accomplish this by outing a signal 286 to the valve control module 278 indicating a desired position (e.g., opened or closed) of the each valve. Also, in the discussion below, the sampling control module 274 activates and deactivates the pumps 134, 138, 162, 170, 184, 192, 206, 230. The sampling control module 274 may accomplish this by outing a signal 288 to the pump control module 278 indicating a desired state (e.g., activated or deactivated) of the each pump.

Figure 3:
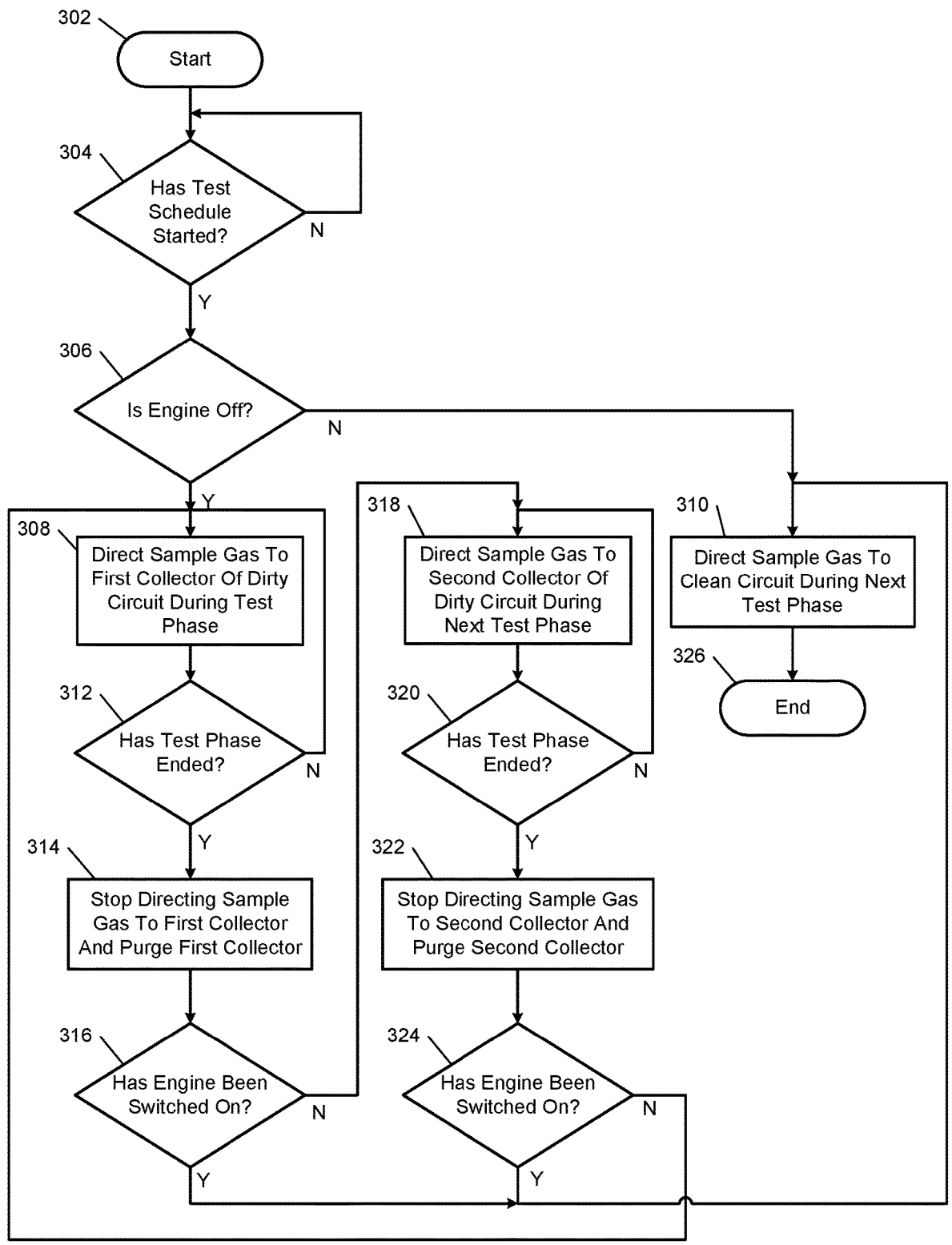
FIGS. 3 through 5 are flowcharts illustrating example methods for collecting clean and dirty exhaust samples.

Referring now to FIG. 3, a method for controlling the flow of sample gas to the sample collectors 144, 146, 152, 154, 176, 178 before the engine 116 is started during a test schedule, and during a test phase of the test schedule during which the engine 116 is started, begins at 302. The method of FIG. 3 is described in the context of the modules of FIG. 2. However, the particular modules that perform the steps of the method of FIG. 3 may be different than those mentioned below and/or the method of FIG. 3 may be implemented apart from the modules of FIG. 2.

At 304, the sampling control module 274 determines whether a test schedule has started. The sampling control module 274 may determine that a test schedule has started with the test phase signal indicates that the first test phase of the test schedule has started. If a test schedule has started, the method continues at 306. Otherwise, the sampling control module 274 continues to determine whether a test schedule has started.

At 306, the engine state module 272 determines whether the engine 116 is off or on. If the engine 116 is off, the method continues at 308. Otherwise, the method continues at 310.

At 308, the sampling control module 274 directs a sample of diluted exhaust gas to the first dirty sample collector 152 during the test phase. The sampling control module 274 directs the diluted exhaust gas sample to the first dirty sample collector 152 by opening the dirty extraction valve 136 and the first dirty fill valve 156 and activating the dirty extraction pump 138. In addition, the sampling control module 274 prevents the flow of diluted exhaust gas to the first clean sample collector 144, the second clean sample collector 146, and the second dirty sample collector 154 during the test phase. The sampling control module 274 accomplishes this by closing the first clean fill valve 148, the second clean fill valve 150, and the second dirty fill valve 158. The sampling control module 274 may also close the clean extraction valve 132 and/or deactivate the clean extraction pump 134 to prevent the flow of diluted exhaust gas to the clean circuit 110.

While directing the diluted exhaust gas sample to the first dirty sample collector 152, the sampling control module 274 may also direct a sample of dilution gas to the first diluent sample collector 176. The sampling control module 274 directs the dilution gas sample to the first diluent sample collector 176 by opening the diluent extraction valve 182 and the first diluent fill valve 186 and activating the diluent extraction pump 184. In addition, the sampling control module 274 prevents the flow of dilution gas to the second diluent sample collector 178 during the test phase by closing the second diluent fill valve 188.

At 312, the sampling control module 274 determines whether the test phase has ended. The sampling control module 274 may use the test phase status signal to determine when the test phase has ended. When the test phase ends, the method continues at 314. Otherwise, the sampling control module 274 continues to direct the diluted exhaust gas sample to the first dirty sample collector 152.

At 314, the sampling control module 274 stops directing diluted exhaust gas to the first dirty sample collector 152 and purges the first dirty sample collector 152. The sampling control module 274 stops directing diluted exhaust gas to the first dirty sample collector 152 by closing the first dirty fill valve 156. The sampling control module 274 may also close the dirty extraction valve 136 and deactivate the dirty extraction pump 138. The sampling control module 274 may purge the first dirty sample collector 152 by venting the diluted exhaust gas sample from the first dirty sample collector 152, sending purge gas to the first dirty sample collector 152, and venting the purge gas from the first dirty sample collector 152.

The sampling control module 274 vents the diluted exhaust gas sample from the first dirty sample collector 152 by opening the first dirty vent valve 216 and activating the vent pump 206. After a predetermined period, the sampling control module 274 stops venting the diluted exhaust gas sample from the first dirty sample collector 152 by closing the first dirty vent valve 216 deactivating the vent pump 206. The sampling control module 274 sends purge gas to the first dirty sample collector 152 by opening the first dirty purge valve 240 and activating the purge pump 230. After a predetermined period, the sampling control module 274 stops sending purge gas to the first dirty sample collector 152 by closing the first dirty purge valve 240 and deactivating the purge pump 230. The sampling control module 274 vents the purge gas from the first dirty sample collector 152 by opening the first dirty vent valve 216 and activating the vent pump 206. After a predetermined period, the sampling control module 274 stops venting the purge gas from the first dirty sample collector 152 by closing the first dirty vent valve 216 and deactivating the vent pump 206.

When purging the first dirty sample collector 152, the sampling control module 274 may send the diluted exhaust gas sample from the first dirty sample collector 152 to the emissions analyzer 114 instead of venting the diluted exhaust gas sample. The sampling control module 274 sends the diluted exhaust gas sample from the first dirty sample collector 152 to the emissions analyzer 114 by opening the first dirty read valve 172 and activating the dirty read pump 170. After a predetermined period, the sampling control module 274 stops sending the diluted exhaust gas sample from the first dirty sample collector 152 to the emissions analyzer 114 by closing the first dirty read valve 172 and deactivating the dirty read pump 170.

At 314, the sampling control module 274 may also stop directing dilution gas to the first diluent sample collector 176 and purge the first diluent sample collector 176. The sampling control module 274 stops directing dilution gas to the first diluent sample collector 176 by closing the first diluent fill valve 186. The sampling control module 274 may also close the diluent extraction valve 182 and deactivate the diluent extraction pump 184. The sampling control module 274 may purge the first diluent sample collector 176 by venting the dilution gas sample from the first diluent sample collector 176, sending purge gas to the first diluent sample collector 176, and venting the purge gas from the first diluent sample collector 176.

The sampling control module 274 vents the dilution gas sample from the first diluent sample collector 176 by opening the first diluent vent valve 208 and activating the vent pump 206. After a predetermined period, the sampling control module 274 stops venting the dilution gas sample from the first diluent sample collector 176 by closing the first diluent vent valve 208 and deactivating the vent pump 206. The sampling control module 274 sends purge gas to the first diluent sample collector 176 by opening the first diluent purge valve 232 and activating the purge pump 230. After a predetermined period, the sampling control module 274 stops sending purge gas to the first diluent sample collector 176 by closing the first diluent purge valve 232 and deactivating the purge pump 230. The sampling control module 274 vents the purge gas from the first diluent sample collector 176 by opening the first diluent vent valve 208 and activating the vent pump 206. After a predetermined period, the sampling control module 274 stops venting the purge gas from the first diluent sample collector 176 by closing the first diluent vent valve 208 and deactivating the vent pump 206.

When purging the first diluent sample collector 176, the sampling control module 274 may send the dilution gas sample from the first diluent sample collector 176 to the emissions analyzer 114 instead of venting the dilution gas sample. The sampling control module 274 sends the dilution gas sample from the first diluent sample collector 176 to the emissions analyzer 114 by opening the first diluent read valve 194 and activating the diluent read pump 192. After a predetermined period, the sampling control module 274 stops sending the dilution gas sample from the first diluent sample collector 176 to the emissions analyzer 114 by closing the first diluent read valve 194 and deactivating the diluent read pump 192.

At 316, the sampling control module 274 determines whether the engine 116 has been switched on since the start of the last test phase (i.e., the test phase when the sampling control module 274 directed the diluted exhaust gas sample to the first dirty sample collector 152). The sampling control module 274 determines whether the engine 116 has been switched on based on the signal output by the engine state module 272 indicating whether the engine 116 is off or on. If the engine 116 has been switched on, the method continues at 310. Otherwise, the method continues at 318.

At 318, the sampling control module 274 directs a sample of diluted exhaust gas to the second dirty sample collector 154 during the next test phase of the test schedule. The sampling control module 274 directs the diluted exhaust gas sample to the second dirty sample collector 154 by opening the dirty extraction valve 136 and the second dirty fill valve 158 and activating the dirty extraction pump 138. In addition, the sampling control module 274 prevents the flow of diluted exhaust gas to the first clean sample collector 144, the second clean sample collector 146, and the first dirty sample collector 152 during the next test phase. The sampling control module 274 accomplishes this closing the first clean fill valve 148, the second clean fill valve 150, and the first dirty fill valve 156. The sampling control module 274 may also close the clean extraction valve 132 and/or deactivate the clean extraction pump 134 in order to prevent the flow of diluted exhaust gas to the clean circuit 110.

While directing the diluted exhaust gas sample to the second dirty sample collector 154, the sampling control module 274 may also direct a sample of dilution gas to the second diluent sample collector 178. The sampling control module 274 directs the dilution gas sample to the second diluent sample collector 178 by opening the diluent extraction valve 182 and the second diluent fill valve 188 and activating the diluent extraction pump 184. In addition, the sampling control module 274 prevents the flow of dilution gas to the first diluent sample collector 176 during the next test phase by closing the first diluent fill valve 186.

At 320, the sampling control module 274 determines whether the next test phase has ended. The sampling control module 274 may use the test phase status signal to determine when the next test phase ends. When the next test phase ends, the method continues at 322. Otherwise, the sampling control module 274 continues to direct the diluted exhaust gas sample to the second dirty sample collector 154.

At 322, the sampling control module 274 stops directing diluted exhaust gas to the second dirty sample collector 154 and purges the second dirty sample collector 154. The sampling control module 274 stops directing diluted exhaust gas to the second dirty sample collector 154 by closing the second dirty fill valve 158. The sampling control module 274 may also close the dirty extraction valve 136 and deactivate the dirty extraction pump 138. The sampling control module 274 may purge the second dirty sample collector 154 by venting the diluted exhaust gas sample from the second dirty sample collector 154, sending purge gas to the second dirty sample collector 154, and venting the purge gas from the second dirty sample collector 154.

The sampling control module 274 vents the diluted exhaust gas sample from the second dirty sample collector 154 by opening the second dirty vent valve 218 and activating the vent pump 206. After a predetermined period, the sampling control module 274 stops venting the diluted exhaust gas sample from the second dirty sample collector 154 by closing the second dirty vent valve 218 and deactivating the vent pump 206. The sampling control module 274 sends purge gas to the second dirty sample collector 154 by opening the second dirty purge valve 242 and activating the purge pump 230. After a predetermined period, the sampling control module 274 stops sending purge gas to the second dirty sample collector 154 by closing the second dirty purge valve 242 and deactivating the purge pump 230. The sampling control module 274 vents the purge gas from the second dirty sample collector 154 by opening the second dirty vent valve 218 and activating the vent pump 206. After a predetermined period, the sampling control module 274 stops venting the purge gas from the second dirty sample collector 154 by closing the second dirty vent valve 218 and deactivating the vent pump 206.

When purging the second dirty sample collector 154, the sampling control module 274 may send the diluted exhaust gas sample from the second dirty sample collector 154 to the emissions analyzer 114 instead of venting the diluted exhaust gas sample. The sampling control module 274 sends the diluted exhaust gas sample from the second dirty sample collector 154 to the emissions analyzer 114 by opening the second dirty read valve 174 and activating the dirty read pump 170. After a predetermined period, the sampling control module 274 stops sending the diluted exhaust gas sample from the second dirty sample collector 154 to the emissions analyzer 114 by closing the second dirty read valve 174 and deactivating the dirty read pump 170.

At 322, the sampling control module 274 may also stop directing dilution gas to the second diluent sample collector 178 and purge the second diluent sample collector 178. The sampling control module 274 stops directing dilution gas to the second diluent sample collector 178 by closing the second diluent fill valve 188. The sampling control module 274 may also close the diluent extraction valve 182 and deactivate the diluent extraction pump 184. The sampling control module 274 may purge the second diluent sample collector 178 by venting the dilution gas sample from the second diluent sample collector 178, sending purge gas to the second diluent sample collector 178, and venting the purge gas from the second diluent sample collector 178.

The sampling control module 274 vents the dilution gas sample from the second diluent sample collector 178 by opening the second diluent vent valve 210 and activating the vent pump 206. After a predetermined period, the sampling control module 274 stops venting the dilution gas sample from the second diluent sample collector 178 by closing the second diluent vent valve 210 and deactivating the vent pump 206. The sampling control module 274 sends purge gas to the second diluent sample collector 178 by opening the second diluent purge valve 234 and activating the purge pump 230. After a predetermined period, the sampling control module 274 stops sending purge gas to the second diluent sample collector 178 by closing the second diluent purge valve 234 and deactivating the purge pump 230. The sampling control module 274 vents the purge gas from the second diluent sample collector 178 by opening the second diluent vent valve 210 and activating the vent pump 206. After a predetermined period, the sampling control module 274 stops venting the purge gas from the second diluent sample collector 178 by closing the second diluent vent valve 210 and deactivating the vent pump 206.

When purging the second diluent sample collector 178, the sampling control module 274 may send the dilution gas sample from the second diluent sample collector 178 to the emissions analyzer 114 instead of venting the dilution gas sample. The sampling control module 274 sends the dilution gas sample from the second diluent sample collector 178 to the emissions analyzer 114 by opening the second diluent read valve 196 and activating the diluent read pump 192. After a predetermined period, the sampling control module 274 stops sending the dilution gas sample from the second diluent sample collector 178 to the emissions analyzer 114 by closing the second diluent read valve 196 and deactivating the diluent read pump 170.

At 324, the sampling control module 274 determines whether the engine 116 has been switched on since the start of the last test phase (i.e., the test phase when the sampling control module 274 directed the diluted exhaust gas sample to the second dirty sample collector 154). The sampling control module 274 determines whether the engine 116 has been switched on based on the signal output by the engine state module 272 indicating whether the engine 116 is off or on. If the engine 116 has been switched on, the method continues at 310. Otherwise, the method continues at 308. In this regard, the method continues to direct diluted exhaust gas to the first dirty sample collector 152 or the second dirty sample collector 152 until the engine 116 is started.

At 310, the sampling control module 274 directs a diluted exhaust gas sample to the clean circuit 110 during the next test phase. More specifically, the sampling control module 274 directs a diluted exhaust gas sample to one of the first and second clean sample collectors 144 and 146 during the next test phase. At 326, the method ends. The method of FIG. 4 may be implemented in conjunction with the method of FIG. 3. For example, the method of FIG. 4 may be executed at 310 of FIG. 3.

Thus, according to the method of FIG. 3, the sampling control module 274 switches from directing exhaust gas to the dirty circuit 112 to directing exhaust gas to the clean circuit 110 based on whether the engine 116 has been switched on. In various implementations, the sampling control module 274 may direct exhaust gas to the clean circuit 110 before the engine 116 is switched on if the engine 116 is warm. The sampling control module 274 may determine that the engine 116 is warm when the engine coolant temperature is greater than a predetermined temperature, when the exhaust temperature is greater than a predetermined temperature, and/or when the amount of time since the engine 116 was last operating is less than a predetermined period (e.g., 30 seconds). If the sampling control module 274 may determine that the engine 116 is warm, the method of FIG. 4 may be executed for the first test phase of a test schedule, and the method of FIG. 3 may not be executed for that test schedule.

The sampling control module 274 may receive the engine coolant temperature from the powertrain control module. The sampling control module 274 may receive the exhaust temperature from the exhaust temperature sensor 252. The sampling control module 274 use a timer to track the amount of time since the engine 116 was last operating based on the signal 284 from the engine state module 272.

Figure 4:
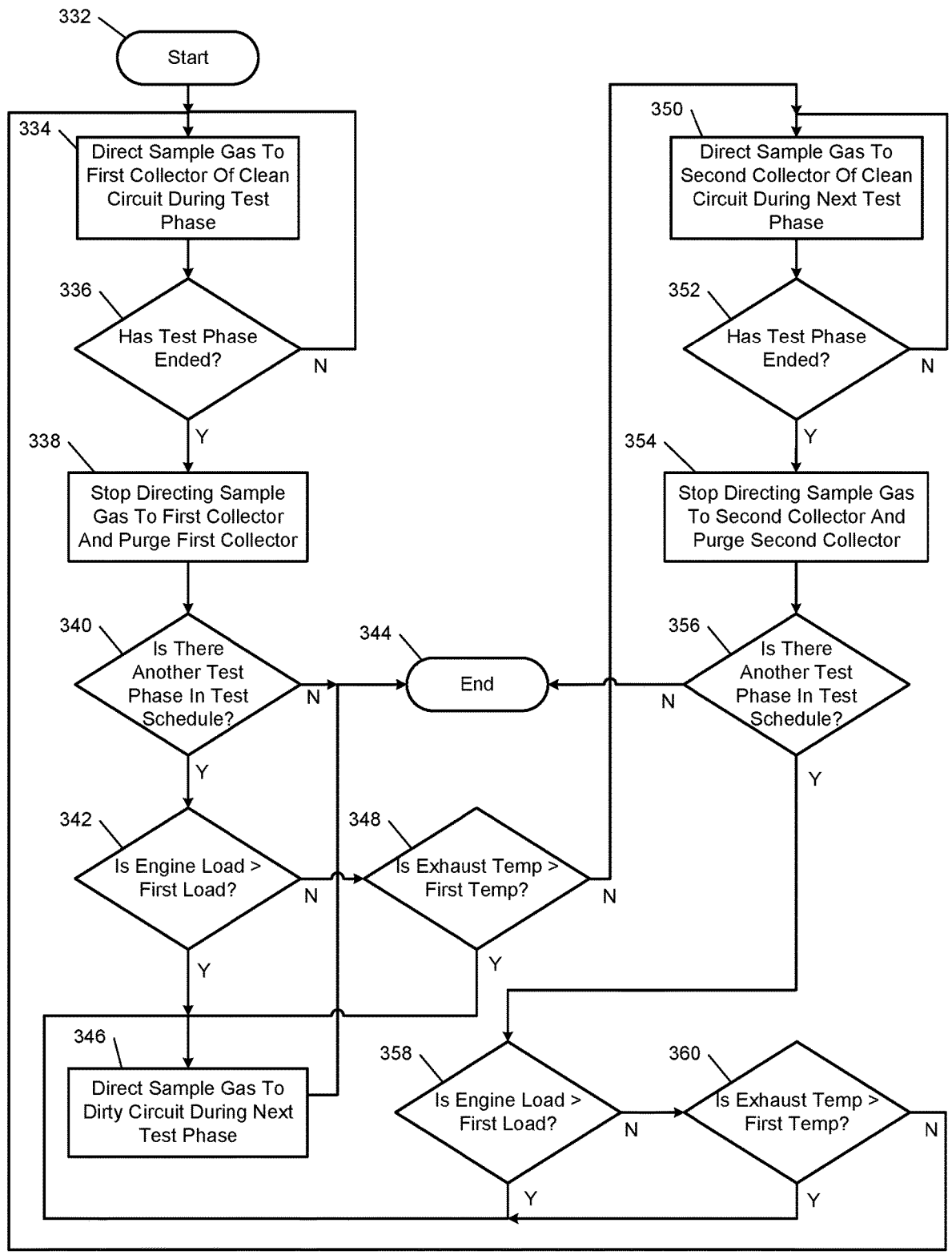

Referring now to FIG. 4, a method for controlling the flow of sample gas to the sample collectors 144, 146, 152, 154, 176, 178 during test phases following the test phase during which the engine 116 is started begins at 332. The method of FIG. 4 may be used to control the flow of sample gas to the sample collectors 144, 146, 152, 154, 176, 178 when one or more operating conditions of the engine 116 indicate that the amounts of emissions produced by the engine 116 are normal. The method of FIG. 4 is described in the context of the modules of FIG. 2. However, the particular modules that perform the steps of the method of FIG. 4 may be different than those mentioned below and/or the method of FIG. 4 may be implemented apart from the modules of FIG. 2.

At 334, the sampling control module 274 directs a sample of diluted exhaust gas to the first clean sample collector 144 during a test phase. The sampling control module 274 directs the diluted exhaust gas sample to the first clean sample collector 144 by opening the clean extraction valve 132 and the first clean fill valve 148 and activating the clean extraction pump 134. In addition, the sampling control module 274 prevents the flow of diluted exhaust gas to the second clean sample collector 146, the first dirty sample collector 152, and the second dirty sample collector 154 during the test phase. The sampling control module 274 accomplishes this by closing the second clean fill valve 150, the first dirty fill valve 156, and the second dirty fill valve 158. The sampling control module 274 may also close the dirty extraction valve 136 and/or deactivate the dirty extraction pump 138 to prevent the flow of diluted exhaust gas to the dirty circuit 112.

While directing the diluted exhaust gas sample to the first clean sample collector 144, the sampling control module 274 also directs a sample of dilution gas to the first diluent sample collector 176. The sampling control module 274 directs the dilution gas sample to the first diluent sample collector 176 by opening the diluent extraction valve 182 and the first diluent fill valve 186 and activating the diluent extraction pump 184. In addition, the sampling control module 274 prevents the flow of dilution gas to the second diluent sample collector 178 during the test phase by closing the second diluent fill valve 188.

At 336, the sampling control module 274 determines whether the test phase has ended. The sampling control module 274 may use the test phase status signal to determine when the test phase has ended. When the test phase ends, the method continues at 338. Otherwise, the sampling control module 274 continues to direct the diluted exhaust gas sample to the first clean sample collector 144.

At 338, the sampling control module 274 stops directing diluted exhaust gas to the first clean sample collector 144 and purges the first clean sample collector 144. The sampling control module 274 stops directing diluted exhaust gas to the first clean sample collector 144 by closing the first clean fill valve 148. The sampling control module 274 may also close the clean extraction valve 132 and deactivate the clean extraction pump 134. The sampling control module 274 may purge the first clean sample collector 144 by sending the diluted exhaust gas sample from the first clean sample collector 144 to the emissions analyzer 114, sending purge gas to the first clean sample collector 144, and venting the purge gas from the first clean sample collector 144.

The sampling control module 274 sends the diluted exhaust gas sample from the first clean sample collector 144 to the emissions analyzer 114 by opening the first clean read valve 164 and activating the clean read pump 162. After a predetermined period, the sampling control module 274 stops sending the diluted exhaust gas sample from the first clean sample collector 144 to the emissions analyzer 114 by closing the first clean read valve 164 and deactivating the clean read pump 162. The sampling control module 274 sends purge gas to the first clean sample collector 144 by opening the first clean purge valve 236 and activating the purge pump 230. After a predetermined period, the sampling control module 274 stops sending purge gas to the first clean sample collector 144 by closing the first clean purge valve 236 and deactivating the purge pump 230. The sampling control module 274 vents the purge gas from the first clean sample collector 144 by opening the first clean vent valve 212 and activating the vent pump 206. After a predetermined period, the sampling control module 274 stops venting the purge gas from the first clean sample collector 144 by closing the first clean vent valve 212 and deactivating the vent pump 206.

At 338, the sampling control module 274 also stops directing dilution gas to the first diluent sample collector 176 and purges the first diluent sample collector 176. The sampling control module 274 stops directing dilution gas to the first diluent sample collector 176 by closing the first diluent fill valve 186. The sampling control module 274 may also close the diluent extraction valve 182 and deactivate the diluent extraction pump 184. The sampling control module 274 may purge the first diluent sample collector 176 by sending the dilution gas sample from the first diluent sample collector 176 to the emissions analyzer 114, sending purge gas to the first diluent sample collector 176, and venting the purge gas from the first diluent sample collector 176.

The sampling control module 274 sends the dilution gas sample from the first diluent sample collector 176 to the emissions analyzer 114 by opening the first diluent read valve 194 and activating the diluent read pump 192. After a predetermined period, the sampling control module 274 stops sending the dilution gas sample from the first diluent sample collector 176 to the emissions analyzer 114 by closing the first diluent read valve 194 and deactivating the diluent read pump 192. The sampling control module 274 sends purge gas to the first diluent sample collector 176 by opening the first diluent purge valve 232 and activating the purge pump 230. After a predetermined period, the sampling control module 274 stops sending purge gas to the first diluent sample collector 176 by closing the first diluent purge valve 232 and deactivating the purge pump 230. The sampling control module 274 vents the purge gas from the first diluent sample collector 176 by opening the first diluent vent valve 208 and activating the vent pump 206. After a predetermined period, the sampling control module 274 stops venting the purge gas from the first diluent sample collector 176 by closing the first diluent vent valve 208 and deactivating the vent pump 206.

At 340, the sampling control module 274 determines whether there is another test phase in the test schedule using, for example, the test phase status signal. If there is another test phase in the test schedule, the method continues at 342. Otherwise, the method ends at 344.

At 342, the sampling control module 274 determines whether the load on the engine 116 is greater than a first load. When the engine load is greater than the first load, the amount of emissions produced by the engine 116 may be greater than normal. The first load may be predetermined. The sampling control module 274 may receive the engine load from the engine control module. If the engine load is greater than the first load, the method continues at 346. Otherwise, the method continues at 348.

At 348, the sampling control module 274 determines whether the exhaust temperature measured by the exhaust temperature sensor 252 is greater than a first temperature. When the exhaust temperature is greater than the first temperature, the amount of emissions produced by the engine 116 may be greater than normal. The first temperature may be predetermined. If the exhaust temperature is greater than the first temperature, the method continues at 346. Otherwise, the method continues at 350.

At 350, the sampling control module 274 directs a sample of diluted exhaust gas to the second clean sample collector 146 during the next test phase. The sampling control module 274 directs the diluted exhaust gas sample to the second clean sample collector 146 by opening the clean extraction valve 132 and the second clean fill valve 150 and activating the clean extraction pump 134. In addition, the sampling control module 274 prevents the flow of diluted exhaust gas to the first clean sample collector 144, the first dirty sample collector 152, and the second dirty sample collector 154 during the test phase. The sampling control module 274 accomplishes this by closing the first clean fill valve 148, the first dirty fill valve 156, and the second dirty fill valve 158. The sampling control module 274 may also close the dirty extraction valve 136 and/or deactivate the dirty extraction pump 138 to prevent the flow of diluted exhaust gas to the dirty circuit 112.

While directing the diluted exhaust gas sample to the second clean sample collector 146, the sampling control module 274 also directs a sample of dilution gas to the second diluent sample collector 178. The sampling control module 274 directs the dilution gas sample to the second diluent sample collector 178 by opening the diluent extraction valve 182 and the first diluent fill valve 186 and activating the diluent extraction pump 184. In addition, the sampling control module 274 prevents the flow of dilution gas to the second diluent sample collector 178 during the test phase by closing the second diluent fill valve 188.

At 352, the sampling control module 274 determines whether the test phase has ended. The sampling control module 274 may use the test phase status signal to determine when the test phase has ended. When the test phase ends, the method continues at 354. Otherwise, the sampling control module 274 continues to direct the diluted exhaust gas sample to the second clean sample collector 146.

At 354, the sampling control module 274 stops directing diluted exhaust gas to the second clean sample collector 146 and purges the second clean sample collector 146. The sampling control module 274 stops directing diluted exhaust gas to the second clean sample collector 146 by closing the second clean fill valve 150. The sampling control module 274 may also close the clean extraction valve 132 and deactivate the clean extraction pump 134. The sampling control module 274 may purge the second clean sample collector 146 by sending the diluted exhaust gas sample from the second clean sample collector 146 to the emissions analyzer 114, sending purge gas to the second clean sample collector 146, and venting the purge gas from the second clean sample collector 146.

The sampling control module 274 sends the diluted exhaust gas sample from the second clean sample collector 146 to the emissions analyzer 114 by opening the second clean read valve 166 and activating the clean read pump 162. After a predetermined period, the sampling control module 274 stops sending the diluted exhaust gas sample from the second clean sample collector 146 to the emissions analyzer 114 by closing the second clean read valve 166 and deactivating the clean read pump 162. The sampling control module 274 sends purge gas to the second clean sample collector 146 by opening the second clean purge valve 238 and activating the purge pump 230. After a predetermined period, the sampling control module 274 stops sending purge gas to the second clean sample collector 146 by closing the second clean purge valve 238 and deactivating the purge pump 230. The sampling control module 274 vents the purge gas from the second clean sample collector 146 by opening the second clean vent valve 214 and activating the vent pump 206. After a predetermined period, the sampling control module 274 stops venting the purge gas from the second clean sample collector 146 by closing the second clean vent valve 214 and deactivating the vent pump 206.

At 354, the sampling control module 274 also stops directing dilution gas to the second diluent sample collector 178 and purges the second diluent sample collector 178. The sampling control module 274 stops directing dilution gas to the second diluent sample collector 178 by closing the second diluent fill valve 188. The sampling control module 274 may also close the diluent extraction valve 182 and deactivate the diluent extraction pump 184. The sampling control module 274 may purge the second diluent sample collector 178 by sending the dilution gas sample from the second diluent sample collector 178 to the emissions analyzer 114, sending purge gas to the second diluent sample collector 178, and venting the purge gas from the second diluent sample collector 178.

The sampling control module 274 sends the dilution gas sample from the second diluent sample collector 178 to the emissions analyzer 114 by opening the second diluent read valve 196 and activating the diluent read pump 192. After a predetermined period, the sampling control module 274 stops sending the dilution gas sample from the second diluent sample collector 178 to the emissions analyzer 114 by closing the second diluent read valve 196 and deactivating the diluent read pump 192. The sampling control module 274 sends purge gas to the second diluent sample collector 178 by opening the second diluent purge valve 234 and activating the purge pump 230. After a predetermined period, the sampling control module 274 stops sending purge gas to the second diluent sample collector 178 by closing the second diluent purge valve 234 and deactivating the purge pump 230. The sampling control module 274 vents the purge gas from the second diluent sample collector 178 by opening the second diluent vent valve 210 and activating the vent pump 206. After a predetermined period, the sampling control module 274 stops venting the purge gas from the second diluent sample collector 178 by closing the second diluent vent valve 210 and deactivating the vent pump 206.

At 356, the sampling control module 274 determines whether there is another test phase in the test schedule using, for example, the test phase status signal. If there is another test phase in the test schedule, the method continues at 358. Otherwise, the method ends at 344.

At 358, the sampling control module 274 determines whether the load on the engine 116 is greater than the first load. If the engine load is greater than the first load, the method continues at 346. Otherwise, the method continues at 360.

At 360, the sampling control module 274 determines whether the exhaust temperature measured by the exhaust temperature sensor 252 is greater than a first temperature. If the exhaust temperature is greater than the first temperature, the method continues at 346. Otherwise, the method continues at 334. In this regard, the method continues to direct diluted exhaust gas to the first clean sample collector 144 or the second clean sample collector 144 until the engine load is greater than the first load, the exhaust temperature is greater than the first temperature, or the test schedule ends.

At 346, the sampling control module 274 directs a diluted exhaust gas sample to the dirty circuit 112 during the next test phase. More specifically, the sampling control module 274 directs a diluted exhaust gas sample to one of the first and second dirty sample collectors 152 and 154 during the next test phase. The method of FIG. 5 may be implemented in conjunction with the method of FIG. 4. For example, the method of FIG. 5 may be executed at 346 of FIG. 4.

Figure 5:
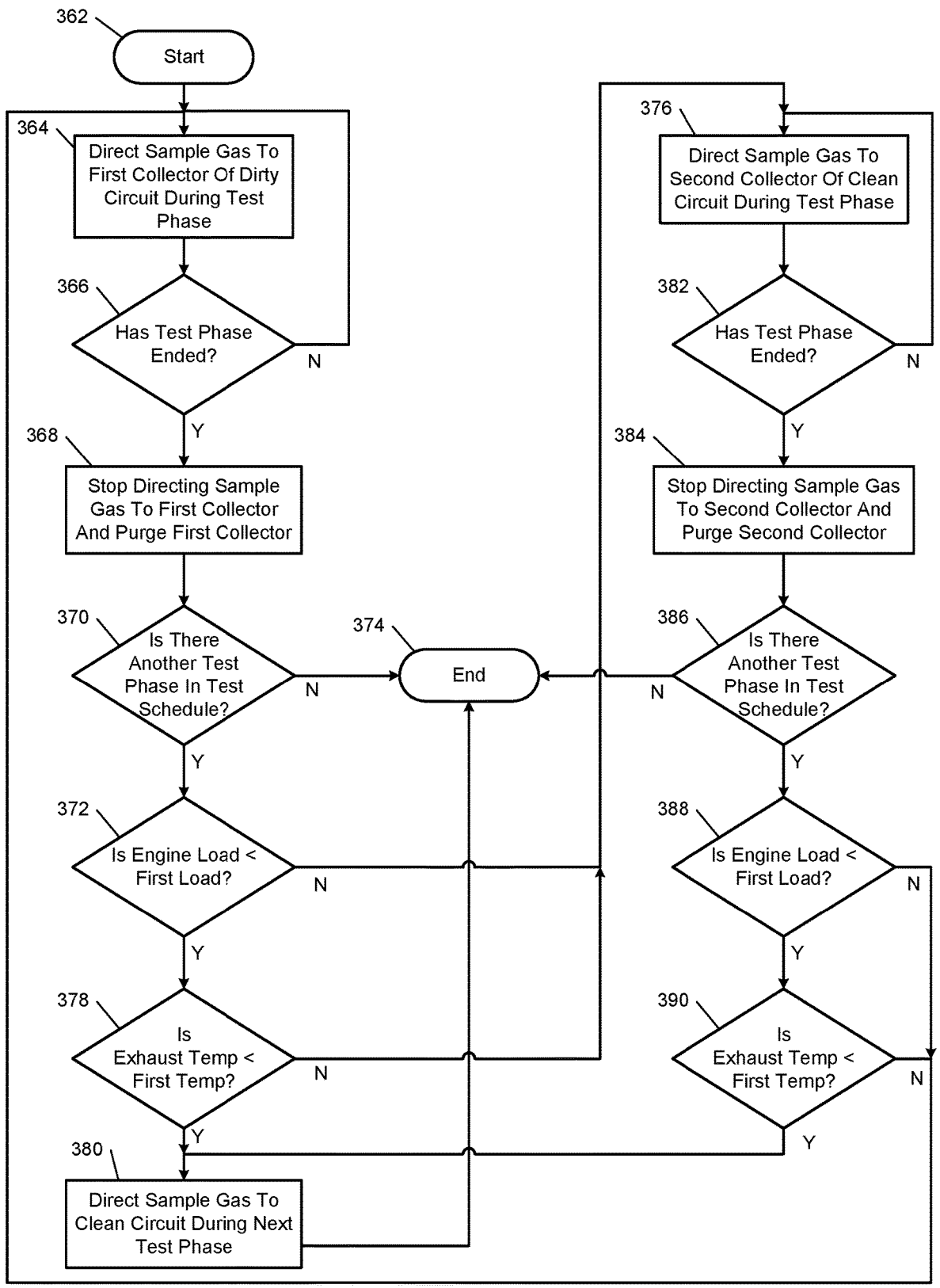

Referring now to FIG. 5, another method for controlling the flow of sample gas to the sample collectors 144, 146, 152, 154, 176, 178 during test phases following the test phase during which the engine 116 is started begins at 362. The method of FIG. 5 may be used to control the flow of sample gas to the sample collectors 144, 146, 152, 154, 176, 178 when one or more operating conditions of the engine 116 indicate that the amounts of emissions produced by the engine 116 are greater than normal. The method of FIG. 5 is described in the context of the modules of FIG. 2. However, the particular modules that perform the steps of the method of FIG. 5 may be different than those mentioned below and/or the method of FIG. 5 may be implemented apart from the modules of FIG. 2.

At 364, the sampling control module 274 directs a sample of diluted exhaust gas to the first dirty sample collector 152 during a test phase. The sampling control module 274 directs the diluted exhaust gas sample to the first dirty sample collector 152 by opening the dirty extraction valve 136 and the first dirty fill valve 156 and activating the dirty extraction pump 138. In addition, the sampling control module 274 prevents the flow of diluted exhaust gas to the first clean sample collector 144, the second clean sample collector 146, and the second dirty sample collector 154 during the test phase. The sampling control module 274 accomplishes this by closing the first clean fill valve 148, the second clean fill valve 150, and the second dirty fill valve 158. The sampling control module 274 may also close the clean extraction valve 132 and/or deactivate the clean extraction pump 134 to prevent the flow of diluted exhaust gas to the clean circuit 110.

While directing the diluted exhaust gas sample to the first dirty sample collector 152, the sampling control module 274 may also direct a sample of dilution gas to the first diluent sample collector 176. The sampling control module 274 directs the dilution gas sample to the first diluent sample collector 176 by opening the diluent extraction valve 182 and the first diluent fill valve 186 and activating the diluent extraction pump 184. In addition, the sampling control module 274 prevents the flow of dilution gas to the second diluent sample collector 178 during the test phase by closing the second diluent fill valve 188.

At 366, the sampling control module 274 determines whether the test phase has ended. The sampling control module 274 may use the test phase status signal to determine when the test phase has ended. When the test phase ends, the method continues at 368. Otherwise, the sampling control module 274 continues to direct the diluted exhaust gas sample to the first dirty sample collector 152.

At 368, the sampling control module 274 stops directing diluted exhaust gas to the first dirty sample collector 152 and purges the first dirty sample collector 152. The sampling control module 274 stops directing diluted exhaust gas to the first dirty sample collector 152 by closing the first dirty fill valve 156. The sampling control module 274 may also close the dirty extraction valve 136 and deactivate the dirty extraction pump 138. The sampling control module 274 may purge the first dirty sample collector 152 by venting the diluted exhaust gas sample (or sending the sample to the emissions analyzer 114), sending purge gas to the first dirty sample collector 152, and venting the purge gas from the first dirty sample collector 152.

At 368, the sampling control module 274 may also stop directing dilution gas to the first diluent sample collector 176 and purge the first diluent sample collector 176. The sampling control module 274 stops directing dilution gas to the first diluent sample collector 176 by closing the first diluent fill valve 186. The sampling control module 274 may also close the diluent extraction valve 182 and deactivate the diluent extraction pump 184. The sampling control module 274 may purge the first diluent sample collector 176 by venting the dilution gas sample (or sending the sample to the emissions analyzer 114), sending purge gas to the first diluent sample collector 176, and venting the purge gas from the first diluent sample collector 176.

The sampling control module 274 vents the dilution gas sample from the first diluent sample collector 176 by opening the first diluent vent valve 208 and activating the vent pump 206. After a predetermined period, the sampling control module 274 stops venting the dilution gas sample from the first diluent sample collector 176 by closing the first diluent vent valve 208 and deactivating the vent pump 206. The sampling control module 274 sends purge gas to the first diluent sample collector 176 by opening the first diluent purge valve 232 and activating the purge pump 230. After a predetermined period, the sampling control module 274 stops sending purge gas to the first diluent sample collector 176 by closing the first diluent purge valve 232 and deactivating the purge pump 230. The sampling control module 274 vents the purge gas from the first diluent sample collector 176 by opening the first diluent vent valve 208 and activating the vent pump 206. After a predetermined period, the sampling control module 274 stops venting the purge gas from the first diluent sample collector 176 by closing the first diluent vent valve 208 and deactivating the vent pump 206.

When purging the first diluent sample collector 176, the sampling control module 274 may send the dilution gas sample from the first diluent sample collector 176 to the emissions analyzer 114 instead of venting the dilution gas sample. The sampling control module 274 sends the dilution gas sample from the first diluent sample collector 176 to the emissions analyzer 114 by opening the first diluent read valve 194 and activating the diluent read pump 192. After a predetermined period, the sampling control module 274 stops sending the dilution gas sample from the first diluent sample collector 176 to the emissions analyzer 114 by closing the first diluent read valve 194 and deactivating the diluent read pump 170.

At 370, the sampling control module 274 determines whether there is another test phase in the test schedule using, for example, the test phase status signal. If there is another test phase in the test schedule, the method continues at 372. Otherwise, the method ends at 374.

At 372, the sampling control module 274 determines whether the load on the engine 116 is less than the first load. If the engine load is less than the first load, the method continues at 378. Otherwise, the method continues at 376.

At 378, the sampling control module 274 determines whether the exhaust temperature measured by the exhaust temperature sensor 252 is less than the first temperature. If the exhaust temperature is less than the first temperature, the method continues at 380. Otherwise, the method continues at 376.

At 376, the sampling control module 274 directs a sample of diluted exhaust gas to the second dirty sample collector 154 during the next test phase of the test schedule. The sampling control module 274 directs the diluted exhaust gas sample to the second dirty sample collector 154 by opening the dirty extraction valve 136 and the second dirty fill valve 158 and activating the dirty extraction pump 138. In addition, the sampling control module 274 prevents the flow of diluted exhaust gas to the first clean sample collector 144, the second clean sample collector 146, and the first dirty sample collector 152 during the next test phase. The sampling control module 274 accomplishes this closing the first clean fill valve 148, the second clean fill valve 150, and the first dirty fill valve 156. The sampling control module 274 may also close the clean extraction valve 132 and/or deactivate the clean extraction pump 134 in order to prevent the flow of diluted exhaust gas to the clean circuit 110.

While directing the diluted exhaust gas sample to the second dirty sample collector 154, the sampling control module 274 may also direct a sample of dilution gas to the second diluent sample collector 178. The sampling control module 274 directs the dilution gas sample to the second diluent sample collector 178 by opening the diluent extraction valve 182 and the second diluent fill valve 188 and activating the diluent extraction pump 184. In addition, the sampling control module 274 prevents the flow of dilution gas to the first diluent sample collector 176 during the next test phase by closing the first diluent fill valve 186.

At 382, the sampling control module 274 determines whether the next test phase has ended. The sampling control module 274 may use the test phase status signal to determine when the next test phase ends. When the next test phase ends, the method continues at 384. Otherwise, the sampling control module 274 continues to direct the diluted exhaust gas sample to the second dirty sample collector 154.

At 384, the sampling control module 274 stops directing diluted exhaust gas to the second dirty sample collector 154 and purges the second dirty sample collector 154. The sampling control module 274 stops directing diluted exhaust gas to the second dirty sample collector 154 by closing the second dirty fill valve 158. The sampling control module 274 may also close the dirty extraction valve 136 and deactivate the dirty extraction pump 138. The sampling control module 274 may purge the second dirty sample collector 154 by venting the diluted exhaust gas sample (or sending the sample to the emissions analyzer 114), sending purge gas to the second dirty sample collector 154, and venting the purge gas from the second dirty sample collector 154.

At 384, the sampling control module 274 may also stop directing dilution gas to the second diluent sample collector 178 and purge the second diluent sample collector 178. The sampling control module 274 stops directing dilution gas to the second diluent sample collector 178 by closing the second diluent fill valve 188. The sampling control module 274 may also close the diluent extraction valve 182 and deactivate the diluent extraction pump 184. The sampling control module 274 may purge the second diluent sample collector 178 by venting the dilution gas sample (or sending the sample to the emissions analyzer 114), sending purge gas to the second diluent sample collector 178, and venting the purge gas from the second diluent sample collector 178.

At 386, the sampling control module 274 determines whether there is another test phase in the test schedule using, for example, the test phase status signal. If there is another test phase in the test schedule, the method continues at 388. Otherwise, the method ends at 374.

At 388, the sampling control module 274 determines whether the load on the engine 116 is less than the first load. If the engine load is less than the first load, the method continues at 390. Otherwise, the method continues at 364.

At 378, the sampling control module 274 determines whether the exhaust temperature measured by the exhaust temperature sensor 252 is less than the first temperature. If the exhaust temperature is less than the first temperature, the method continues at 380. Otherwise, the method continues at 364. In this regard, the method continues to direct diluted exhaust gas to the first dirty sample collector 152 or the second dirty sample collector 154 until the engine load is less than the first load and the exhaust temperature is greater than the first temperature or until the test schedule ends.

At 380, the sampling control module 274 directs a diluted exhaust gas sample to the clean circuit 110 during the next test phase. More specifically, the sampling control module 274 directs a diluted exhaust gas sample to one of the first and second clean sample collectors 144 and 146 during the next test phase. For example, the method of FIG. 4 may be executed at 380 of FIG. 5.

Thus, according to the methods of FIGS. 4 and 5, the sampling control module 274 switches between directing exhaust gas to the clean circuit 110 and directing exhaust gas to the dirty circuit 112 depending on the engine load and/or the exhaust temperature. Other vehicle operating conditions may be used in addition to or instead of engine load and/or exhaust temperature. For example, the sampling control module 274 may direct exhaust gas to the dirty circuit 112 until the engine 116 has been on for a predetermined period. The sampling control module 274 may then direct exhaust gas to the clean circuit 110 during each test phase after the test phase in which the predetermined period expires.

In another example, the sampling control module 274 may switch between directing exhaust gas to the clean circuit 110 and directing exhaust gas to the dirty circuit 112 based on the state of charge of a battery (not shown) that supplies power to an electric motor (not shown) of the vehicle. For example, the engine state module 272 may predict that the engine 116 is about to start when the battery state of charge is less than a predetermined value. In turn, the sampling control module 274 may direct exhaust gas to the clean circuit 110 until the engine 116 is about to start, at which point the sampling control module 274 may direct exhaust gas to the dirty circuit 112. In one example, the sampling control module 274 directs exhaust gas to the clean circuit 110 during each test phase before the test phase in which the battery state of charge becomes less than the predetermined value. The sampling control module 274 then directs exhaust gas to the dirty circuit 112 during the test phase after the test phase in which the battery state of charge becomes less than the predetermined value, and during each test phase thereafter until the engine 116 is started.

The sampling control module 274 may also switch between directing exhaust gas to the clean circuit 110 and directing exhaust gas to the dirty circuit 112 based on whether a diagnostic trouble code (DTC) is set or a malfunction indicator light (MIL) is activated. For example, the sampling control module 274 may stop directing exhaust gas to the clean circuit 110 and start directing exhaust gas to the dirty circuit 112 when a DTC is set or a MIL is activated. The engine control module may output a signal to the sampling control module 274 indicating whether a DTC is set or a MIL is activated.

The methods of FIGS. 3, 4, and 5 may all be performed during a single test schedule. For example, a test schedule may have five phases, the engine 116 may be started during the second phase, the load on the engine 116 may become greater than the first load during the third phase, and the engine load may become less than the first load during the fourth phase. Thus, according to the method of FIG. 3, the sampling control module 274 may direct exhaust gas to the first dirty sample collector 152 during the first phase, direct exhaust gas to the second dirty sample collector 154 during the second phase, and then switch to directing exhaust gas to the clean circuit 110 during the third phase. Also, according to the method of FIG. 4, the sampling control module 274 may direct exhaust gas to the first clean sample collector 144 during the third phase, and then switch to once again directing exhaust gas to the dirty circuit 112 during the fourth phase. Further, according to the method of FIG. 5, the sampling control module 274 may direct exhaust gas to the first dirty sample collector 152 during the fourth phase, and then switch to once again directing exhaust gas to the clean circuit 110 during the fifth phase.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An apparatus for collecting samples for an emissions test system, the apparatus comprising:
   a dilution tunnel configured to receive exhaust gas from an engine and dilution gas from a dilution gas source;
   a clean circuit including a clean collector and a clean supply line configured to supply gas from the dilution tunnel to the clean collector;
   a dirty circuit including a first dirty collector, a second dirty collector, a first dirty supply line configured to supply gas from the dilution tunnel to the first dirty collector, and a second dirty supply line configured to apply gas from the dilution tunnel to the second dirty collector, the first and second dirty supply lines connection to the dilution tunnel independent of the clean supply line; and
   a sampling control module configured to:
      direct gas from the dilution tunnel to the first dirty collector when the engine is off at the start of a first test phase;
      direct gas from the dilution tunnel to the second dirty collector at the start of a second test phase after the first test phase when the engine is not switched on during the first test phase; and
      direct gas from the dilution tunnel to the clean circuit at the end of the first test phase when the engine is switched on during the first test phase.

2. The apparatus of claim 1 wherein, during the second test phase, the sampling control module is configured to:
   vent gas from the first dirty collector to an exhaust line;
   supply purge gas from a purge gas source to the first dirty collector; and
   vent the purge gas from the first dirty collector to the exhaust line.

3. The apparatus of claim 2 wherein:
   the sampling control module is configured to direct gas from the dilution tunnel to the clean circuit at the end of the second test phase when the engine is switched on during the second test phase; and
   the sampling control module is configured to direct gas from the dilution tunnel to the first dirty collector at the start of a third test phase after the second test phase when the engine is not switched on during the second test phase.

4. The apparatus of claim 1 wherein:
   the clean circuit further includes a clean fill valve disposed in the clean supply line; and
   the dirty circuit includes a first dirty fill valve disposed in the first dirty supply line and a second dirty fill valve disposed in the second dirty supply line.

5. The apparatus of claim 4 wherein the sampling control module is configured to:
   open the first dirty fill valve, close the clean fill valve, and close the second dirty fill valve when directing gas from the dilution tunnel to the first dirty collector;
   open the second dirty fill valve, close the clean fill valve, and close the first dirty fill valve when directing gas from the dilution tunnel to the second dirty collector; and
   open the clean fill valve, close the first dirty fill valve, and close the second dirty fill valve when directing gas from the dilution tunnel to the clean collector.

6. The apparatus of claim 4 wherein:
   the clean circuit further includes:
   a clean vent valve configured to control the flow of gas from the clean collector to an exhaust line;
   a purge valve configured to control the flow of purge gas from a purge gas source to the respective collector; and
   a read valve configured to control the flow of gas from the clean collector to an analyzer; and
   the dirty circuit further includes:
   a first vent valve configured to control the flow of gas from the first dirty collector to the exhaust line;
   a second vent valve configured to control the flow of gas from the second dirty collector to the exhaust line;
   a first purge valve configured to control the flow of purge gas from the purge gas source to the first dirty collector; and
   a second purge valve configured to control the flow of purge gas from the purge gas source to the second dirty collector.

7. The apparatus of claim 4 wherein:
   the clean circuit further includes a clean pump disposed in the clean supply line; and
   the dirty circuit further includes a dirty pump disposed in at least one of the first dirty and second dirty supply lines.

8. The apparatus of claim 7 wherein the sampling control module is configured to:
   activate the dirty pump and deactivate the clean pump when directing gas from the dilution tunnel to at least one of the first and second dirty collectors; and
   activate the clean pump and deactivate the dirty pump when directing gas from the dilution tunnel to the clean collector.

9. An apparatus for collecting samples for an emissions test system, the apparatus comprising:
   a dilution tunnel configured to receive exhaust gas from an engine and dilution gas from a dilution gas source;
   a clean circuit configured to receive gas from the dilution tunnel;
   a dirty circuit configured to receive gas from the dilution tunnel independent of the clean circuit; and
   a sampling control module configured to:
      direct gas from the dilution tunnel to one of the clean and dirty circuits;
      stop directing gas to one of the clean and dirty circuits and start directing gas to the other one of the clean and dirty circuits based on at least one of a load on the engine and a temperature of exhaust produced by the engine;

when the engine load is less than a first load, direct gas from the dilution tunnel to the clean circuit; and when the engine load is greater than the first load, stop directing gas from the dilution tunnel to the clean circuit and start directing gas from the dilution tunnel to the dirty circuit.

10. The apparatus of claim 9 wherein the sampling control module is configured to:

direct gas from the dilution tunnel to the clean circuit when the exhaust temperature is less than a first temperature; and stop directing gas from the dilution tunnel to the clean circuit and start directing gas from the dilution tunnel to the dirty circuit when the exhaust temperature is greater than the first temperature.

11. The apparatus of claim 9 wherein:

the clean circuit includes a clean collector and a clean supply line configured to supply gas from the dilution tunnel to the clean collector; and the dirty circuit includes a dirty collector and a dirty supply line configured to supply gas from the dilution tunnel to the dirty collector, wherein the dirty supply line is connected to the dilution tunnel independent of the clean supply line.

12. The apparatus of claim 9 wherein the sampling control module is configured to:

direct gas from the dilution tunnel to the dirty circuit during a first test phase when the engine is off at the start of the first test phase; and direct gas from the dilution tunnel to the clean circuit during a second test phase after the first test phase when the engine is switched on during the first test phase.

13. An apparatus for collecting samples for an emissions test system comprising:

a dilution tunnel configured to receive exhaust gas from an engine and dilution gas from a dilution gas source;

a first collector configured to collect gas from the dilution tunnel;

a second collector configured to collect gas from the dilution tunnel; and a sampling control module configured to:

direct gas from the dilution tunnel to the first collector and prevent the flow of gas from the dilution tunnel to the second collector during a first test phase of a test schedule;

direct gas from the dilution tunnel to the second collector, prevent the flow of gas from the dilution tunnel to the first collector, vent gas from the first collector to an exhaust line, supply purge gas from a purge gas source to the first collector, and vent the purge gas from the first collector to the exhaust line during a second test phase of the test schedule; and direct gas from the dilution tunnel to the first collector and prevent the flow of gas from the dilution tunnel to the second collector during a third test phase of the test schedule.

14. The apparatus of claim 13 further comprising:

a first supply line configured to supply gas from the dilution tunnel to the first collector;

a first fill valve disposed in the first supply line;

a second supply line configured to supply gas from the dilution tunnel to the second collector; and a second fill valve disposed in the second supply line.

15. The apparatus of claim 14 further comprising:

a first vent valve configured to control the flow of gas from the first collector to the exhaust line;

a first purge valve configured to control the flow of purge gas from the purge gas source to the first collector; and a first read valve configured to control the flow of gas from the first collector to an analyzer; and a second vent valve configured to control the flow of gas from the second collector to the exhaust line;

a second purge valve configured to control the flow of purge gas from the purge gas source to the second collector; and a second read valve configured to control the flow of gas from the second collector to the analyzer.

* * * * *